United States Patent [19]

Plank et al.

[11] Patent Number: 4,666,979
[45] Date of Patent: May 19, 1987

[54] METAL COMPOUNDS OF ACID GROUP-CONTAINING CONDENSATION PRODUCTS AND CO-CONDENSATION PRODUCTS OF KETONES AND ALDEHYDES

[75] Inventors: Johann Plank; Alois Aignesberger, both of Trostberg, Fed. Rep. of Germany

[73] Assignee: SKW Trostberg AG, Trostberg, Fed. Rep. of Germany

[21] Appl. No.: 762,129

[22] Filed: Aug. 2, 1985

[30] Foreign Application Priority Data

Aug. 7, 1984 [DE] Fed. Rep. of Germany ....... 3429068

[51] Int. Cl.$^4$ ................................................ C08G 8/28
[52] U.S. Cl. .................... 525/54.21; 525/515; 525/521; 528/227; 528/230; 528/245
[58] Field of Search ............. 525/521, 515, 54.21; 528/227, 230, 245

[56] References Cited

U.S. PATENT DOCUMENTS

| 2,321,451 | 6/1943 | Bauer. | |
|---|---|---|---|
| 2,571,089 | 10/1951 | Harvey et al. | 525/521 X |
| 2,766,218 | 10/1956 | Harvey et al. | 525/521 |
| 4,007,084 | 2/1977 | Chan et al. | 528/227 X |
| 4,026,867 | 5/1977 | Gardiner | 528/3 |
| 4,076,683 | 2/1978 | Cherubim et al. | 528/227 X |

FOREIGN PATENT DOCUMENTS

| 0078938 | 10/1982 | European Pat. Off. |
| 637732 | 10/1936 | Fed. Rep. of Germany. |
| 1583015 | 4/1970 | Fed. Rep. of Germany. |
| 2341923 | 3/1975 | Fed. Rep. of Germany. |
| 2138407 | 12/1979 | Fed. Rep. of Germany. |
| 595366 | 11/1944 | United Kingdom. |

Primary Examiner—Lucille M. Phynes
Attorney, Agent, or Firm—Felfe & Lynch

[57] ABSTRACT

The present invention provides metal compounds of acid group-containing condensation products or co-condensation products of ketones and aldehydes, obtainable by the reaction of acid group-containing ketone-aldehyde condensation products and/or co-condensation products with mono- or polyvalent metal compounds and/or metal complex compounds of metals of Groups IIIA to VIIIA and/or IB to VB of the Periodic System.

The present invention also provides processes for the production of these metal compounds, which can be used as thickening agents, surface-active agents, emulsifiers, dispersion agents and/or liquefying agents, especially in aqueous systems.

40 Claims, No Drawings

METAL COMPOUNDS OF ACID GROUP-CONTAINING CONDENSATION PRODUCTS AND CO-CONDENSATION PRODUCTS OF KETONES AND ALDEHYDES

The present invention is concerned with metal compounds of acid group-containing condensation products or co-condensation products of ketones and aldehydes.

The base-catalysed condensation of ketones with aldehydes has been known for a long time. In its end stage, it leads to water-insoluble resins (cf. e.g. J. Scheiber, "Chemie und Technologie der künstlichen Harze", Volume 1, Stuttgart 1961, page 164 et seq.).

The introduction of acid groups into the ketone-aldehyde resin makes possible the formation of water-soluble condensation products. Thus, for example Federal Republic of Germany Patent Specification No. 2,341,923 discloses readily water-soluble condensation products of cycloalkanones, formaldehyde and sulphite which can be used, for example, as additives for inorganic binding agents for the improvement of their properties. Other additives known for the same purpose are condensation products of formaldehyde, acid group-introducing compounds and aminoplast formers, such as urea or malamine (cf. Federal Republic of Germany Patent Specifications Nos. 1,671,058 and 2,359,291).

However, these known condensation products display some disadvantages. One disadvantage of the water-soluble cycloalkanone-aldehyde condensation products is, in particular, their very low thermal stability. Thus, for example, in the case of the evaporation of a solution of cycloalkanone-formaldehyde condensation products even under gentle conditions (about 50° C.), already substantially water-insoluble powdered compounds result. Because of the relatively expensive starting material melamine, melamine resins are of limited suitability for a large-scale use and urea resins have a low storage stability. Lignin sulphonate resins (lignosulphonates) are marcromolecular compounds which are anionic polyelectrolytes. They are obtained in the case of the production of paper from wood, for example by the sulphite process, as waste products (so-called "black lye"), with a frequently varying composition and numerous impurities. The lignosulphonates have found use as inexpensive additives in the textile, tanning and constructional aids industries, as well as in mineral oil production as dispersing agents and/or retention agents. However, their quality is not uniform and they display undesired side effects, such as a retarding of the hardening.

Therefore, the action of these lignosulphonates is very limited and, in particular, is not uniform, for which reason numerous processes have been developed for improving the quality of sulphite waste liquors. Thus, U.S. Pat. No. 2,935,504 describes an improvement of lignin-containing sulphite waste liquors by (1) fractionation of the crude lignin, (2) oxidation, (3) treatment with iron, aluminium, chromium or copper salts and (4) by the combined use of the oxidation and metal salt treatment. U.S. Pat. No. 3,544,460 describes an improvement of sulphonated lignin by oxidation at a temperature of at least 200° C. and preferably of from 230° to 270° C., U.S. Pat. No. 4,219,471 describes a multi-stage process for the production of an appropriate lignosulphonate product by alkaline oxidation, hydrolysis, partial desulphonation, subsequent resulphonation and further reaction with halogenocarboxylic acids and, finally, U.S. Pat. No. 4,220,585 describes a process for the production of additives with improved dispersion properties from lignosulphonates and titanium or zirconium salts and/or mixtures of these metal salts with iron salts.

Federal Republic of Germany Patent Specification No. 2,916,705 describes the production of a resin product b co-condensation of a sulphite-modified melamine resin with lignin sulphonate-urea-formaldehyde resins. In this way, the problem arising in connection with melamine resins of the expensive melamine starting material is, admittedly, solved by a partial substitution thereof by lignin sulphonate-urea. However, the production of these resins requires a very labour-intensive multi-stage process, the production costs thus being very high and uneconomic.

Federal Republic of Germany Patent Specification No. 3,144,673 describes condensation products which are produced by the reaction of ketones, aldehydes and acid group-introducing compounds and German Patent Specification No. 3,315,152 discloses co-condensation products which are obtainable by the co-condensation of ketones and aldehydes with acid group-introducing compounds and with aminoplast formers and/or aromatic compounds and/or condensation products thereof and/or with lignin sulphonate resins and/or with cellulose derivatives. The condensation and co-condensation products are, like the lignin sulphonates, anionic polyelectrolytes and can be obtained, by appropriate choice of the ketone, aldehyde or of the co-condensation components, the mole ratios and reaction conditions, with properties as thickening agents, retention agents, surface-active agents, dispersion agents and/or liquefying agents, which are characterised by a good water-solubility and thermostability.

However, the described products based on lignosulphonates or ketone-aldehyde condensation products display deficiencies. Thus, it is known to the expert that untreated lignosulphonates as dispersion agents only display a limited action and thus require either very high dosages or, however, good effects cannot be achieved at all. The treatment and chemical modification of the lignosulphonates admittedly leads to products with, in general, improved effectiveness and especially also uniformity but it involves a very high expense since it consists, in part, of very laborious multi-step processes, of energy-intensive and technically difficult processes, for example oxidation at temperatures above 200° C., or also of reactions with expensive starting materials, for example with titanium or zirconium salts. Furthermore, it is common to all products based on lignosulphonate that, due to the production processes used, they contain numerous impurities and by-products, for example sugar compounds, which, in the case of use, impair their action or lead to completely undesired side effects and thus limit their use. From the literature, it is also known that the especially temperature-stable iron chromium lignosulphonates when used, for example, as dispersion agents for drilling muds, already display above 120° C. a diminution of their thinner action and thus are not suitable for use with comparatively long-lasting temperature stressing above 150° C. (cf. Kelly, J. Jr., "How Lignosulphonates Behave at High Temperatures, Oil Gas Journal, Oct. 5, 1964, pp. 112–119). Finally, the condensation and co-condensation products based on ketones and aldehydes have the disadvantage that, in the case of some uses, for example for the dispersion or thickening of aqueous systems, they admittedly have, as a rule, a good but not always optimum action and cannot, therefore, be used to the desired wide extent.

Therefore, there is still a need for additives with thickening, retention, emulsifying, dispersing and/or liquefying action, as well as with surface-activities, which do not display the above-described disadvantages of deficiencies.

Therefore, it is an object of the present invention to provide additives with an improved action as thickening, retention, emulsifying, dispersing and liquefying agents and/or as surface-active agents.

Thus, according to the present invention, there are provided metal compounds of acid group-containing condensation products or co-condensation products of ketones and aldehydes, obtainable by the reaction of acid group-containing ketone-aldehyde condensation products and/or co-condensation products with mono- or polyvalent metal compounds and/or metal complex compounds of metals of Groups IIIA to VIIIA and/or IB to VB of the Periodic System.

The metal compounds of acid group-containing condensation and/or co-condensation products of ketones and aldehydes according to the present invention possess not only a high thermal stability but, surprisingly, also an excellent improvement of their properties in comparison with the condensation or co-condensation products based on ketones and aldehydes; therefore, they are valuable, generally and widely usable additives which on the basis of their starting materials and of the simple and economic carrying out of the process for their production, can also be widely used.

As acid group-containing condensation products of ketones and aldehydes, there can be used, for example, the condensation products known from Federal Republic of Germany Patent Specification No. 3,144,673 and as co-condensation products the resins described in Federal Republic of Germany Patent Specification No. 3,315,152.

The condensation and co-condensation products of ketones and aldehydes used according to the present invention preferably have the following constitution:

The residue R of the aldehydes R-CHO can be a hydrogen atom or an aromatic or non-aromatic (cyclic or acyclic) carbo- or heterocyclic radical or also an araliphatic radical in which the number of the carbon atoms or carbon and hetero atoms is preferably up to 10. Aromatic radicals include, for example, α- and β-naphthyl, phenyl and furfuryl radicals; araliphatic radicals include, for example, benzyl and phenethyl radicals; and non-aromatic radicals include, for example, cycloalkyl and especially alkyl radicals, preferably with up to 6 carbon atoms, such as methyl, ethyl, propyl and butyl radicals. The aliphatic radicals can also be branched or unsaturated and are then, for example, vinyl radicals.

The aldehydes can also contain one or more substituents which do not impair the condensation reaction, for example amino, hydroxyl, alkoxy or alkoxy-carbonyl substituents and/or also the acid groups contained in the condensation products. There can also be used aldehydes with more than one aldehyde group, for example di- or trialdehydes, which, as a result of their increased reactivity, can be especially preferred in some cases. There can also be used, for example, in the case of the lower saturated aldehydes, such as formaldehyde or acetaldehyde, the polymeric forms, for example paraformaldehyde or paraldehyde.

Examples of saturated aliphatic aldehydes include formaldehyde (or paraformaldehyde), acetaldehyde (or paraldehyde) and butyraldehyde; of substituted saturated aliphatic aldehydes, 3-methoxypropionaldehyde and acetaldol; of unsaturated aliphatic aldehydes, acrolein, crotonaldehyde, furfural, 4-methoxyfurfural and propargyl aldehyde; and of dialdehydes, glyoxal and glutardialdehyde. Formaldehyde is especially preferably used as the aldehyde.

Ketones employed according to the present invention for the condensation products are symmetrical or asymmetrical ketones with preferably acyclic aliphatic, araliphatic and/or aromatic hydrocarbon radicals, at least one radical being non-aromatic, and/or cycloalkanones. The hydrocarbon radicals preferably contain up to 10 carbon atoms.

Acyclic aliphatic radicals are straight-chained or preferably branched, unsaturated or preferably saturated alkyl radicals, for example methyl, ethyl, propyl, butyl, isobutyl or nonyl radicals. Araliphatic radicals include, for example, benzyl and phenethyl radicals and aromatic radicals include, for example α- and β-naphthyl and especially phenyl radicals. Cycloalkanones are preferably derived from cyclopentane or cyclohexane or from their methyl-substituted derivatives.

The ketones can also be substituted by one or more substituents which do not impair the condensation reaction, for example by amino, hydroxyl, alkoxy or alkoxycarbonyl substituents, and/or also by the acid groups contained in the condensation products.

Examples of saturated acyclic ketones include acetone, methyl ethyl ketone and methyl isobutyl ketone; of substituted saturated acyclic ketones methoxyacetone, diacetone alcohol and ethyl acetoacetate; of unsaturated aliphatic ketones methyl vinyl ketone, mesityl oxide and phorone; of araliphatic ketones acetophenone, 4-methoxyacetophenone and 4-acetylbenzenesulphonic acid; and of diketones diacetyl, acetylacetone and benzoylacetone.

The aldehydes and ketones can be used not only in pure form but also in the form of addition compounds with the acid group-introducing material, for example as aldehyde-sulphite adducts or as hydroxymethanesulphinic acid salts. Two or more different aldehydes and/or ketones can also be used.

The total number of carbon atoms or possibly of carbon atoms and ketones is so chosen that the hydrophilic character of the condensation products is maintained. Therefore, it is also dependent not only upon the number of acid groups in the condensation product but also upon the ratio of ketone/aldehyde and possibly of the remaining components. For the aldehydes, the preferred total number is 1 to 11 and for the ketones is 3 to 12.

The mole ratio of ketones/aldehydes/acid groups is, in general, 1/1 to 18/0.02 to 3 but, depending upon special purposes of use, variations are also possible.

The aminoplast formers which can be used according to the present invention include all aminoplast formers usual for aminoplasts, especially for the condensation with formaldehyde, thus especially melamine and/or urea, guanamides and dicyandiamide, but also, for example, aminoacetic acid. According to the present invention, as aromatic compounds there can be used all phenols suitable for the formation of phenolic resins, thus especially phenol, cresols and xylenols, but, in addition to these, also reactively substituted and/or polynuclear aromatics, for example naphthalene and its derivatives. Instead of the aminoplast formers or phenols, there can also be used, wholly or partly, their pre-condensates or condensation products of various degree of condensation, especially their condensation products with formaldehyde, for example novolacs. There can also be used acid group-containing aminoplast formers and aromatic compounds, for example naphthalenesulphonic acids.

Lignin sulphonate resins used according to the present invention are the lignin sulphonates formed in the case of the treatment of wood with sodium sulphite (sulphite process) and/or their reaction products with formaldehyde and/or sulpho group-introducing compounds, for example sulphites, pyrosulphites or aldehyde-bisulphite addition compounds.

Cellulose derivatives are especially cellulose esters, for example cellulose acetate, and, in the first place, cellulose ethers, for example methyl cellulose, hydroxymethyl cellulose, hydroxyethyl cellulose and carboxymethyl cellulose.

The proportion of aminoplast formers and/or aromatic compounds or their condensates, of lignin sulphonate resins and/or cellulose derivatives depends especially upon the intended use; in general, it is from 2 to 50% by weight and especially from 10 to 40% by weight, referred to the final condensation product, but upward or downward variations are also possible.

The condensation products can be obtained by reacting ketones, aldehydes and acid group-introducing compounds under alkaline pH conditions, it thereby being possible to proceed in the manner of a one-pot reaction. As embodiments of the process for the production of the condensation products, the following variants are possible:

I. Taking the ketone and the acid group-introducing compound and adding the aldehyde.

II. Taking the aldehyde and the acid group-introducing compound and adding the ketone.

III. Taking the ketone and adding a mixture of aldehyde and acid group-introducing compound or, for example in the case of sulphite, adding a compound of the aldehyde with the acid group-introducing compound.

IV. Taking the aldehyde and adding a mixture of ketone and acid group-introducing compound or adding a compound of the ketone with the acid group-introducing compound and V. Simultaneous taking of the aldehyde, ketone and acid group-introducing compound.

In general, the process variant I is preferred but process variant V is especially suitable for the reaction of less reactive components.

The reaction generally already commences upon gentle heating and then proceeds exothermally so that, as a rule, cooling is necessary. For the achievement of a uniform product or, especially in the case of the use of less reactive starting products, a post-heating s advisable, which can last up to several hours.

In general, the reaction is carried out at a pH value of from 7 to 14 and preferably of from 10 to 13. The pH value adjustment can take place, for example, by adding hydroxides of mono- or divalent cations or by taking an acid group-introducing material, for example sodium sulphite, which, in aqueous solution, hydrolyses with an alkaline reaction.

The reaction can be carried out not only in a homogeneous phase but also in a heterogeneous phase. As the reaction medium, as a rule, there is used water or a mixture containing water, the proportion of water preferably being at least 50% by weight. As non-aqueous solvent additions, there are especially preferred polar organic solvents, for example alcohols or acid esters. The reaction can be carried out not only in an open vessel but also in an autoclave, in which case it can be preferable to work in an inert gas atmosphere, for example under nitrogen.

The condensation products can, if desired, be isolated from their solutions or dispersions obtained after the reaction, for example by evaporation on a rotary evaporator or by spray drying. The solutions or dispersions obtained can, however, also be used directly as such, i.e. without the previous isolation of the condensation products, they are reacted with the metal compounds.

As aldehyde and ketone starting materials, there are used the above-mentioned aldehydes and ketones and mixtures of ketones and/or aldehydes can also be employed. The aldehydes and ketones can be used not only in pure form but also as compounds with the acid group-introducing materials, for example as bisulphite addition compounds. They can be present or added not only in aqueous solution but also in non-aqueous solution, for example in alcoholic solution.

In the case of aldehydes or ketones with lower alkyl chains, the reaction takes place especially quickly and exothermally, whereas in the case of compounds with sterically demanding substituents, for example methyl isobutyl ketone or benzylacetone, a long thermal post-treatment is necessary for complete reaction.

As acid group-introducing compounds, there can be used all compounds introducing the acid groups under the condensation conditions, for example pure acids, salts of the acids with mono- to trivalent inorganic or organic cations or addition compounds and especially addition compounds with the aldehydes and ketones used according to the present invention. Examples therefor include sulphites, hydrogen sulphites, pyrosulphites, bisulphite addition compounds of aldehydes and ketones, amidosulphonic acid derivatives, taurine salts and sulphanilic acid salts; hydroxymethanesulphinic acid salts; aminoacetic acid salts; and phosphorus acid salts.

The co-condensation products can be obtained by the reaction of the components under alkaline pH conditions, it thereby being possible to proceed in the manner of a one-pot reaction. In general, the aldehyde is added to a solution or suspension of the remaining components; however, other process variants are also possible, for example the addition of the co-condensation components and/or of the ketone, addition of a mixture of aldehyde and acid group-introducing compound or, for example in the case of sulphite, of a compound of the aldehyde with the acid group-introducing compound, addition of a mixture of ketone and acid group-introducing compound or of a compound of the ketone with the acid group-introducing compound to the remaining components, or simultaneously taking all of the components.

In general, the reaction already commences upon gentle heating and then proceeds exothermally so that, as a rule, cooling is necessary. For the achievement of a uniform product or, especially in the case of the use of less reactive starting products, a post-heating is preferable, which can last for up to several hours.

The reaction is, in general, carried out at a pH value of from 7 to 14 and preferably from 10 to 13. The pH value adjustment can take place, for example, by adding hydroxides of mono- or divalent cations or by taking an acid group-introducing material, for example sodium sulphite, which hydrolyses in aqueous solution with an alkaline reaction.

The reaction can be carried out not only in a homogeneous phase but also in a heterogeneous phase. As the reaction medium, as a rule, there is used water or a mixture containing water, the proportion of water preferably being at least 50% by weight. As non-aqueous solvent additions, there are especially preferred polar organic solvents, for example alcohols or acid esters. The reaction can be carried out not only in an open vessel but also in an autoclave, in which case it can be preferable to work in an inert gas atmosphere, for example under nitrogen.

If desired, the co-condensation products can be isolated from their solutions or dispersions obtained after the reaction, for example by evaporation on a rotary evaporator or by spray drying. However, the solutions or dispersions obtained can also be used directly, i.e. without the previous isolation of the co-condensation products, they are reacted with the metal compounds.

As aldehyde and ketone starting materials, there are used the above-mentioned aldehydes and ketones and mixtures of ketones and/or aldehydes can also be used. The aldehydes and ketones can be used not only in pure form but also as compounds with the acid group-introducing material, for example as bisulphite addition compounds. They can be present or added not only in aqueous solution but also in non-aqueous solution, for example in alcoholic solution.

In the case of aldehydes or ketones with a low alkyl chain, the reaction takes place especially quickly and exothermally, whereas in the case of compounds with sterically demanding substituents, for example methyl isobutyl ketone or benzylacetone, a long thermal post-treatment is necessary for the complete reaction.

As acid group-introducing compounds, there can be used all compounds introducing the acid groups under the condensation conditions, for example pure acids, salts of the acids with mono- to trivalent inorganic or organic cations or addition compounds, especially addition compounds with the aldehydes and ketones used according to the present invention. Examples therefor include sulphites, hydrogen sulphites, pyrosulphites, bisulphite addition compounds of aldehydes and ketones, amidosulphonic acid salts, taurine salts and sulphanilic acid salts; hydroxymethanesulphinic acid salts; aminoacetic acid salts; and phosphorus acid salts. However, the acid groups can also be introduced, wholly or partly, by acid group-containing aminoplast formers, aromatic compounds and/or condensates thereof or by corresponding acid group-containing lignin sulphonates and/or cellulose derivatives.

As metal compounds, there can be used compounds of metals of Groups IIIA to VIIIA and/or of Groups IB to VB of the Periodic System and preferably mono- and polyvalent inorganic or organic salts of metals of Groups VIA to VIIIA and of Groups IB to IVB of the Periodic System according to the definition in KirkOthmer, "Encyclopedia of Chemical Technology" Interscience Publishers, New York, London, Sydney, 2nd edition, 1965, Vol. 8, pp. 94–96. Especially preferred salts are those which are easily soluble since the formation of the metal compounds proceeds especially quickly when using them. However, in principle, there can also be used sparingly or difficultly soluble metal compounds, for example the almost insoluble hydroxides or carbonates of heavy metals insofar as, in an economically acceptable time, there are obtained the metal compounds with the ketone/aldehyde base resins according to the present invention. Examples of metal compounds include di- and tetravalent manganese salts, divalent nickel salts, di- and tetravalent lead salts, tri- and hexavalent chromium compounds, di- and trivalent iron compounds, mono- and trivalent thallium compounds, mono- and divalent copper and mercury compounds and trivalent bismuth compounds. As salts, there can be used all conventional salts of inorganic or organic acids, for example, the salts of the hydrohalic acids, sulphuric acid, phosphoric acid, nitric acid, acetic acid, formic acid and the like; however, it is thereby to be taken into account that salts which are sparingly water-soluble are preferably not used.

As metal complex compounds, there can be used all neutral, anionic or cationic metal complexes of metals of Groups IIIA to VIIIA and IB to VB of the Periodic System of the elements which, under the reaction conditions, are less stable than the aimed for metal compound so that the metal can pass over from the weaker complex into the more stable metal compound. Preferably, there are used complex compounds of metals of Groups VIA to VIIIA and of Groups IB to IVB of the Periodic System, for example halogeno, amino, nitro or oxalato complexes of the transition metals iron, cobalt, copper or silver.

For the production of the metal compounds, in principle there can also be used mixtures of one or more metal salts and/or metal complexes. These mixed metal compounds can be especially preferable for the achievement of certain properties, for example the combination of the typical action for one metal with the effect of another metal, and are then preferred.

In general, the production of the metal compounds takes place by reaction of the condensation or co-condensation products based on ketone/aldehyde with the metal salts or metal complexes. It is not limited to any special pH value and can take place in an acidic, neutral or alkaline medium. Thus, it is, for example, possible to carry out the synthesis of the metal compound in a pH value range in which a sparingly soluble metal salt or metal complex is better soluble, an increase of the speed of the reaction thereby being achieved. Thus, it is, for example, preferable to react the hydroxides or ccarbonates of heavy metals under acidic pH value conditions with the ketone-aldehyde resin, whereas, for example, zinc oxide or aluminium hydroxide are more preferably used in strongly alkaline solution as zincate or aluminate complexes and thus ensure a rapid reaction to give the desired metal compound. In the case of production under acidic or alkaline conditions, it is also possible to add the metal in elementary from insofar as it dissolves under these conditions and thereby produces in situ a metal salt for the reaction with the resin. Examples herefor include adding iron powder to an acid-adjusted solution of the starting resin or dissolving aluminium powder in a strongly alkaline resin. It is also possible to carry out the reaction at pH values at which the metal used is itself insoluble and, for example, would be present in the form of a hydroxide if the metal were already used in complexed form which is sufficiently stable under the given pH conditions but, on the other hand, is less stable than the desired end product so that the metal is converted from the less stable into the more stable compound.

The reaction of the ketone/aldehyde resin (condensation product or co-condensation product) with the metal compound or metal complex compound introducing the metal can take place at all process stages or in the case of all varianets of the processes described for the production of the condensation products or co-condensation products in Federal Republic of Germany Patent Specifications Nos. 3,144,673 or 3,315,152 or described above. Thus, it is, for example, possible, in the case of the production of a metal compound from pure ketone/aldehyde resin, already to add the metal salt to a mixture of ketone and acid group-introducing compound and subsequently to react with aldehyde or to produce a ketone-aldehyde precondensate, to convert it with a metal salt into a metal compound and then to introduce the acid group. However, a preferred process is the addition of a metal salt or metal complex compound to the final condensation product, for example to a solution which has the necessary pH value or has been adjusted thereto. For the production of the metal compounds of the co-condensation products, it can, in some cases, be desirable to carry out the co-condensation with a component already present as final metal compound, for example to react a metal compound of an acetone-formaldehyde-sulphite resin with a pure phenol-formaldehyde resin. The reaction with the metal compounds or metal complex compounds can be carried out in the reaction mixture obtained in the case of the production of the condensation products or co-condensation products without previous isolation of the condensation or co-condensation products.

The production of the metal compounds preferably takes place in the temperature range of from 10° to 250° C. and especially of from 20° to 100° C. The choice of the reaction temperature preferable in any particular case depends especially upon the ability of the metal compound, upon the stability of the metal complex compound and upon the stability of the metal compound to be produced of the condensation or co-condensation product. Thus, for example, the very stable iron and chromium compounds of ketone/aldehyde resins can already be obtained by simple stirring of a solution of the resin with the metal salt at ambient temperature. In general, the speed of formation of the metal compound is quicker at an elevated temperature and, therefore, in cases in which a very slow reaction is to be expected, in which, for example, the metal salt has a low solubility or the metal complex is only somewhat less stable than the metal compound to be produced, working at an elevated temperature is preferred. In such cases, reaction at an elevated temperature, for example in an autoclave, can be preferred. However, it is also possible to work at lower temperatures, for example in hot countries to carry out the reaction completely without heating if sufficient time is available to await complete reaction which, under these circumstances, can take several weeks. The reaction can be carried out not only in a homogeneous phase but also in a heterogeneous phase. As a rule, the reaction medium used is water or a mixture containing water, the proportion of water thereby preferably being at least 50% by weight. As non-aqueous solvent additions, polar organic solvents, for example alcohols or acid esters, are especially preferred. The reaction can be carried out not only in an open vessel but also in an autoclave, in which case it can be preferable to work in an inert gas atmosphere, for example under nitrogen.

The proportion of metal in the metal compound according to the present invention is preferably <70% by weight and especially from 0.1 to 20% by weight. It is especially dependent upon the desired properties of the metal compound and for emulsifying agents, dispersion agents and liquefiers is preferably from 0.1 to 12% by weight, for surface-active agents is preferably from 0.1 to 5% by weight and for retention and thickening agents is preferably from 2 to 20% by weight. However, the proportion of metal can also depend upon the atomic weight of the metal; metals with a comparatively low atomic weight can, for the achievement of the same effect, as a rule be lower dosed than metals with a high atomic weight since, for the properties of the metal compound, the number of metal atoms per reaction point is decisive. For this reason, for example, with aluminium in the case of very low dosages of, for example, 0.5% by weight, good effects are achieved, whereas, for example, in the case of lead salts, for the achievement of an ascertainable effectiveness, as a rule amounts of at least 2% by weight are necessary.

On the basis of their properties, the metal compounds according to the present invention can be used as thickening agents, emulsifying agents, dispersion agents, surface-active agents (tensides), retention agents and/or liquefying agents, especially for aqueous systems. The desired properties can thereby be controlled by appropriate choice of the condensation products and/or co-condensation products or of their starting compounds and their mutual mole ratios and/or the nature of the metal. As examples of aqueous systems in which products according to the present invention can be advantageously used, there may be mentioned inorganic binding agent suspensions and solutions, pigment and dyestuff dispersions, oil-in-water emulsions, aqueous kaolin and clay suspensions and oil-water-coal suspensions. As a result of their good thermostability, the co-condensation products according to the present invention are also highly suitable as additives for inorganic binding agents. As dispersion agents, they can be used, for example, for the production of flowable concrete or self-levelling grouts or for the dispersion of oil well cement mixtures, for example, for which, because of the high temperatures which occur, a sufficient temperature stability is necessary. Surface-active agents according to the present invention lower the surface tension of aqueous solutions and can be used, for example, as foamer additives in the production of foamed cement. In the same way, they can be used as air-entraining agents for mortar or cement or as surface-active additives in the case of enhanced oil recovery. As retention agents, they can be used for the production of suspensions of hydraulic binding agents which display a good water retention ability, for example in the case of oil well cement slurries or in the case of liquid adhesives, and as thickening agents they are very suitable, for example, in mineral oil technology for increasing the viscosity of aqueous solutions or suspensions.

Therefore, the present invention is also concerned with the use of the metal salts according to the present invention as thickening agents, retention agents, surface-active agents, emulsifying agents, dispersion agents and/or liquefying agents and especially as additives for aqueous systems.

The products are preferably used in the form of solutions or dispersions and especially in the form of aqueous solutions or dispersions. In general, the solids content of these compositions is from 10 to 70 and especially of from 20 to 50% by weight.

There can also be used two or more of the products according to the present invention with the same, similar and/or also different effectiveness of mixtures thereof with one or more known additives with the same, similar and/or different effectiveness, for example mixtures with known dispersion agents, tensides or concrete additives. In this way, the properties of the end products can often be still further changed or differentiated.

For the achievement of the desired properties of the metal compounds according to the present invention, it is preferable to start from condensation products and/or co-condensation products of aldehydes or ketones in which the desired properties are already present.

The prevailing properties of the condensation and co-condensation products depend especially upon the nature and the mole ratio of the components. The hydrophilic character decreases with a lowering proportion of the acid groups, whereby, as a rule, in the case of a value of <0.15 mol in the case of condensation products or of <0.02 mol in the case of co-condensation products, a complete water-solubility can no longer be achieved. For dispersion agents, as carbonyl compounds there are preferably used formaldehye, glyoxal and acetone and a ratio of ketone/aldehyde/acid groups of 1/1–18/0.25–3.0, for surface-active materials preferably aldehyde and ketones with longer alkali radicals or with aralkyl radicals which contain at leaast more than one carbon atom, and a ratio of ketone/aldehyde/acid groups of 1/1–6/0.05–1, and for retention and thickening agents aldehydes and ketones with alkyl radicals which contain up to three carbon atoms and a mole ratio of ketone/aldehyde/acid groups of 1/2–6/0.6–2. For dispersion agents for salt-containing cementation systems, it can also be preferable to start from a condensation product of ketone, aldehyde and acid group-introducing compound which contains the components ketone, aldehyde and acid group-introducing compound in the mole ratio of 1/1–18/0.25–3.0 and which has been produced by the reaction of these components at a temperature of from 60° to 85° C. and preferably at a pH value of from 8 to 14, as is described in Federal Republic of Germany Patent Specification No. 3,344,291. Furthermore, the nature of the co-condensation components determines the prevailing properties of the co-condensation products: reaction of the ketone-aldehyde resin with aminoplast formers, aromatic compounds and/or their condensation products brings about an improvement of the dispersion properties, whereas by co-condensation with cellulose derivatives, a retention or thickening action of the resin product is achieved. The incorporation of lignin sulphonate resins causes not only an increase of the dispersion action but also of the surface-active properties. By means of a combination of the conditions preferably employed for obtaining specific properties, for example by a combination of the kind of starting materials especially suitable for a particular property with the mole ratio preferred for another kind of property, there can also be achieved mixed properties if this is desired.

Apart from the nature of the condensation products and/or co-condensation products, the properties of the metal compounds according to the present invention can especially also be influenced by the nature and amount of the metal. Thus, for example, for the production of products suitable as dispersion agents, condensation products or co-condensation products selected according to the above criteria in which the desired properties already prevail, are preferably reacted with metals with a lower oxidation stage, respectively of 1 to 3, whereas, for example, for the production of retention and/or thickening agents, metals with higher oxidation stages, especially of 4 to 7, are preferably used. Thus, for example, products with a very good retention action in drilling runds are obtained by the addition of hexavalent chromium or heptavalent manganese compounds. There can also be used two or more metal compounds, preferably with different metals. By mixing two metals with different oxidation stages, for example of divalent iron with hexavalent chromium, there can thus also be achieved mixed properties in which, depending upon the amount ratio, one or other property can prevail. Such mixed properties can also be achieved, influenced and/or differentiated by the reaction of the metal compounds and/or metal complex compounds with two or more condensation products and/or co-condensation products with different prevailing properties or by the selection of an appropriate condensation product or co-condensation product which already possesses mixed properties.

In the following, there are set out some preferred fields of use for the products according to the present invention and the advantages achieved with them:

Dispersion agents and liquefiers can be used for the viscosity lowering of suspensions of inorganic binding agents, for example, cement or gypsum slurries, and make possible the production of flowing concrete or concrete with a reduced water requirement. However, they can also be used for the liquefaction of aqueous coal, coal/oil or kaolin and especially of clay suspensions, for example of bentonite, sepiolite or attapulgite slurries. The action of the metal compounds according to the present invention in these systems is especially strongly marked and is maintained even in the case of comparatively long-lasting high temperature stressing, for example of 300° C., in the case of the addition of large amounts of, for example, sodium, potassium, calcium or magnesium salts or in the case of changes of the pH value of the clay suspension. In the case of bentonite suspensions, for example, the dispersion effectiveness of the metal compounds according to the present invention of condensation products of ketones and aldehydes increases by up to 500% in comparison with the corresponding condensation products without metal (action=100%). Good effectiveness also exists with regard to the dispersing or emulsifying of water-oil or oil-water emulsions, the aqueous phase of which can contain a clay mineral, for example bentonite, and which are frequently used in mineral oil drilling technology. Thus, the metal compounds according to the present invention are considerably better suited for the production of the systems referred to in drilling technology as "invert emulsion drilling fluids" than commercially usual pure lignosulphonates or lignosulphonates modified with heavy metals, such as iron or chromium.

Retention agents based on the metal compounds according to the present invention are generally suitable for the achievement of a water-retention ability in aqueous or water-containing systems. By aqueous systems, there are thereby to be understood, for example, suspensions of inorganic binding agents, such as cement or gypsum, of clay minerals, such as bentonite or attapulgite, or of alkaline earth metal carbonates and hydroxides, such as chalk or magnesium hydroxide, in water, whereas water-containing systems can be, for example, coal-water-oil suspensions or water-clay-oil mixtures. Thus, in aqueous oil well cement slurries or in aqueous clay suspensions which are frequently used in mineral oil technology as drilling fluids, the metal compounds display a very good action with regard to a reduction of the high pressure filtrate which, in the case of the circulation of the drilling fluid, is released to porous formations in the drill hole. An especial advantage of the products according to the invention thereby consists in the fact that this retention action is also maintained at elevated temperatures, for example of above 200° C. There is thereby given the possibility of use in very deep wells in the case of which the commercially usual products based on lignosulphonate fail because of their lower thermal stability. However, the retention action of the metal compounds according to the present invention can also be utilised for the achievement of a water-retention ability in constructional material mixtures, for example in mortar or plaster or in under-water concrete. Their use as an additve for the prevention of the bleeding or sedimentation of concrete is also possible.

Thickening agents based on the metal compounds according to the present invention can also be used, for example, for increasing the viscosity in suspensions of inorganic binding agents or clay minerals, for example cement or gypsum, or of bentonite. Preferred uses include the thickening of Portland or oil well cement slurries, of wall or plaster mortars, as well as of clay-containing drilling fluids based upon fresh or salt water. It is also possible to use the metal compounds according to the present invention as thickening agents for fresh and salt water systems which are used in the case of the putting into place or putting into operation of drill holes, as well as in the case of the treatment of deposits, for example, polymer or micellar floodings. A particular advantage of the thickening agents according to the present invention is, in the case of their use, the very good temperature, pH and shear stability of the thickened solutions, whereby the described uses can be carried out especially economically and without quality loss in the case of long-time use.

Surface-active agents based on the metal compounds according to the present invention are especially useful for the production of aerated and foamed concrete or for the introduction of micro-air pores in the case of the production of frost-thaw stable mortar or concrete. In the field of mineral oil technology, they make possible, for example, the mobilisation of residual oil in the case of tenside or micellar floodings, whereby, in part, microemulsions can result.

The following Examples of production and use explain the present invention in more detail, without limiting it thereto. If not otherwise stated, parts and percentages given hereinbefore and hereinafter mean parts by weight and percentages by weight.

EXAMPLES

A. Production of the Metal Compounds

Example A.1

Into a stirrer container equipped with an internal thermometer, a reflux cooler and a storage vessel, are placed, in the given sequence:
 432 parts by weight of water
 189 parts by weight of sodium sulphite, as well as
 165 parts by weight of acetone
and the suspension obtained is heated to 56° C.

As soon as the acetone reflux has commenced, to the reaction material are added dropwise a total of 900 parts by weight of a 30% formaldehyde solution. Because of the strongly exothermal reaction, there is first slowly and uniformly added the first tenth of the formaldehyde solution and then the commencement of the reaction is awaited, which manifests itself by the commencement of a yellow coloration of the material and an increased acetone reflux. After fading of this initial exothermal phase, the remaining formaldehyde is added thereto and the temperature of the reaction mixture is allowed to increase to the boiling point. Subsequent to the formaldehyde addition, there follows a thermal post-treatment of the batch at 95° C. for 30 minutes.

To this resin solution with a temperature of 95° C., a solids content of 30% and a pH value of 12 are added 283 parts by weight of a 40% aqueous solution of ferrous sulphate heptahydrate, followed by boiling for a further 2 hours. The amount of iron introduced corresponds to an addition of 4.5% iron, referred to the resin used.

The solution obtained of the metal compound has a solids content of 27%. After cooling to ambient temperature, its Brookfield viscosity is 270 mPa.s.

The product has dispersion properties and can be used, for example, for lowering the viscosity of cement slurries.

Example A.2

Into the reaction vessel of Example A.1 are placed successively:
 775 parts by weight of water
 310 parts by weight of sodium hydroxide
 581 parts by weight of aminoacetic acid, as well as
 450 parts by weight of acetone
and the mixtures is heated until the commencement of an acetone reflux (about 56° C.).

Subsequently, 1884 parts by weight of a 37% formaldehyde solution are added thereto from the storage vessel in the manner described in Example A.1, the temperature of the reaction mixture thereby being allowed to increase to 80° C. At the end of the formaldehyde addition, the reaction mixture is boiled under reflux for 24 hours for the completion of the condensation.

The alkaline resin solution obtained, with a solids content of 36%, is, while still hot, adjusted with 50% sulphuric acid to a pH value of 4, subsequently mixed with 222 parts by weight of a 40% solution of aluminium sulphate octadecahydrate $(Al_2(SO_4)_3.18H_2O)$ in water with a temperature of 80° C. and heated to the boil for one hour. The addition of aluminium salt corresponds to an amount of 0.5% aluminium, referred to the resin used.

The cooled solution of the metal compound has a solids content of 33.5% and has a low viscosity. Its pH value is 4.

The product acts as a dispersion agent and can be used, for example, for the reduction of the water requirement of mortar.

Example A.3

900 parts by weight of water
 378 parts by weight of sodium sulphite, as well as
 278 parts by weight of acetone
are placed in the reaction vessel of Example A.1 and brought to reaction in the manner there described with 1800 parts by weight of a 30% formaldehyde solution.

Subsequent to a thermal post-treatment at 95° C. for 30 minutes, the reaction mixture is cooled to ambient temperature and adjusted with acetic acid to a pH value of 4. To the 29% resin solution are then added 478 parts by weight of a 40% aqueous solution of ferric sulphate with a water content of 8.85% and the reaction mixture is stirred for 2 hours at ambient temperature. After adjusting the pH value to 8 with 50% sodium hydroxide solution, a 30% solution of the iron compound is thereby formed.

For the production of the iron-chromium compound, to the solution of the iron compound are added 348.5 parts by weight of a 40% aqueous solution of sodium dichromate dihydrate and the solution again stirred for 2 hours at ambient temperature.

The addition of iron and chromium salt corresponds to an amount of, in each case, 5.0% iron and chromium, respectively, referred to the resin used. The brown-coloured solution obtained of the iron-chromium compound has a solids content of 29%. At ambient temperature, its Brookfield viscosity is 17 mPa.s.

The iron compound has a dispersion action and the iron-chromium compound has not only dispersion but also retention properties.

Example A.4

The stirrer vessel of Example A.1 is successively supplied with:
- 2000 parts by weight of water
- 625 parts by weight of taurine
- 200 parts by weight of sodium hydroxide, as well as
- 580 parts by weight of acetone.

Subsequently, the reaction mixture is heated to 56° C. and from the storage vessel are added thereto a total of 3000 parts by weight of a 30% aqueous glyoxal solution, the temperature of the batch thereby being allowed to increase to 65° C. Subsequent to the aldehyde addition, there is carried out a post-heating for 6 hours in the temperature range of from 65° to 70° C.

The solution of the acetone-glyoxal resin so obtained has a solids content of 23.5%. For the conversion into a metal compound, the hot resin solution is mixed with 367.5 parts by weight of a 40% solution of cupric sulphate pentahydrate in water with a temperature of 80° C. and stirred for 2 hours at 85° C. The addition of copper salt corresponds to a content of 2.5% copper, referred to the acetone-glyoxal resin used.

The cooled solution of the copper compound is adjusted with 50% aqueous sodium hydroxide solution to a pH value of 7.5. The Brookfield viscosity of the 21% solution is 12 mPa.s.

The product has dispersion properties and liquefies, for example, aqueous slurries very well.

Example A.5

An open reaction vessel equipped with stirring means, a thermometer, a reflux cooler and a storage vessel is supplied, in the given sequence, with:
- 424 parts by weight of water
- 227 parts by weight of sodium sulphite, as well as
- 393 parts by weight of cyclohexanone and this suspension is heated to 90° C. Subsequently, a total of 1000 parts by weight of 30% formaldehyde solution are allowed to run slowly from the storage vessel into the batch, the temperature of the reaction mixture thereby being allowed to increase to 100° C. Subsequent to the addition of the formaldehyde, the mixture is post-treated for 10 minutes at 95°–100° C.

The yellow coloured 39% resin solution so obtained is brought, in a hot state, with phosphoric acid to pH 4 and mixed all at once with 321 parts by weight of a 40% aqueous solution of ferric sulphate with 8.85% water of crystalisation. The addition of iron salt thereby corresponds to an amount of 4% iron, referred to the cyclohexanone starting resin. After stirring at 95° C. for 2 hours, the formation of the metal compound is finished. The batch is diluted with 170 parts by weight of water to a solids content of 33%, then cooled to ambient temperature and finally adjusted to pH 6. The solution of the metal compound has a solids content of 33% and its viscosity is 2 Pa.s at ambient temperature.

The product acts as a dispersion agent, for example for drilling fluids based on fresh water-clay.

Example A.6

In a stirrer container equipped with an internal thermometer are placed 1000 parts by weight of a 36% solution of the iron-free acetone-formaldehyde-sulphite resin produced according to Example A.1 and heated to 95° C.

To this batch are added 1000 parts by weight of a 36% aqueous solution of a commercially available ferrochromium lignosulphonate containing 1.25% by weight of iron, as well as 3.5% by weight of chromium, said solution having a temperature of 95° C., as well as 75 parts by weight of salicylic acid and 75 parts by weight of paraformaldehyde. The reaction mixture is boiled for 6 hours at a pH of 4–5.

The solution contains an iron-chromium compound of the co-condensation product of lignin sulphonate with the acetone-formaldehyde resin. It is adjusted with 50% aqueous sodium hydroxide solution to a pH of 8 and has a solids content of 29%. At ambient temperature, its Brookfield viscosity is 42 mPa.s.

The metal compound has dispersion properties and can be used, for example, for the liquefaction of mortar.

Example A.7

The reaction vessel of Example A.1 is supplied with
- 3700 parts by weight of water
- 1890 parts by weight of sodium sulphite, as well as
- 2100 parts by weight of acetone and, while stirring, the mixture is heated to 56° C. Subsequently, according to the method described in Example A.1, the mixture is reacted with a total of 9000 parts by weight of a 30% formaldehyde solution, the temperature of the reaction material thereby being allowed to increase to 85° C. Subsequent to the aldehyde addition, the mixture is stirred for 2 hours at 85° C. and, for the compensation of the viscosity increase of the solution which occurs, a total of 14000 parts by weight of water are added thereto portionwise.

The so obtained solution of the acetone-formaldehyde resin with a solids content of 17% serves as starting component for the co-condensation with a phenol-formaldehyde resin which is prepared as follows:
- 610 parts by weight of water
- 1260 parts by weight of a 30% formaldehyde solution
- 940 parts by weight of phenol, as well as
- 138 parts by weight of a 20% aqueous sodium hydroxide solution are placed, in the given sequence, in the reaction vessel of Example A.1 and heated to 100° C., with stirring. After reaching a temperature of 60° to 75° C., a slightly exothermal reaction thereby occurs with yellow coloration of the solution. As soon as the temperature has reached 100° C., stirring is continued for 5 minutes, followed by cooling to ambient temperature.

The solution of the phenol-formaldehyde resin has a solids content of 45% and an alkaline reaction.

For the co-condensation of the two resin components, the above-produced amount of phenol-formaldehyde is mixed with 4000 parts by weight of the acetone-formaldehyde resin, the pH is adjusted to 7.5 with sulphuric acid and 136 parts by weight of para-formaldehyde are added thereto. This reaction mixture is stirred for 5 hours at 95° C. and, for the compensation of the viscosity increase which occurs, it is diluted with a total of 5000 parts by weight of hot water.

After cooling to ambient temperature, the solution of the acetone/phenolic resin co-condensate has a Brookfield viscosity of 1300 mPa.s and a solids content of 14%.

The production of the metal compound takes place by adjusting 6000 parts by weight of the solution of the co-condensation product to a pH value of 10 with aqueous sodium hydroxide solution, mixing with 131 parts by weight of zirconium sulphate tetrahydrate and boiling for 3 hours. This addition of zirconium salt corresponds to an amount of 4% zirconium metal, referred to the resin co-condensation product used. During the reaction to give the metal compound, a viscosity increase of the solution occurs which, by the addition of a total of 2000 parts by weight of water, is compensated for.

The cooled solution of the metal compound is adjusted to a pH value of 7. In the case of a solids content of 16%, its Brookfield viscosity is 7700 mPa.s.

The product has a very good retention action and can be used, for example, in fresh water drilling fluids up to 300° C.

Example A.8

In the reaction vessel according to Example A.1, are placed
3710 parts by weight of water
378 parts by weight of sodium sulphite
295 parts by weight of mesityl oxide, as well as
696 parts by weight of acetone
and the mixture is heated to 60° C., while stirring. As soon as this temperature is reached, there are added thereto, in the manner described in Example A.1, a total of 3000 parts by weight of a 30% formaldehyde solution from the storage vessel, followed by a thermal post-treatment of the batch at 95° C. for 2 hours. As a result of the viscosity increase which occurs, the resin solution must be gradually diluted with, in all, 7500 parts by weight of hot water. The resin solution so obtained has a solids content of 12% and an alkaline reaction (pH=12).

For the production of the metal compound, the resin solution is adjusted to pH 4 with 50% sulphuric acid, 600 parts by weight of water are added thereto and, at 95° C., 2100 parts by weight of a hot, 10% aqueous potassium permanganate solution and the batch is kept for 3 hours at 90° to 95° C. This addition of manganese salt corresponds to a content of 4% manganese, referred to the starting resin used.

During the reaction, the pH value of the solution is continuously monitored and possibly adjusted to 4. For the compensation of the viscosity increase which occurs, a total of 6200 parts by weight of hot water are added thereto portionwise.

After completion of the reaction, the solution of the metal compound is cooled to ambient temperature and adjusted to a weakly alkaline pH value. The Brookfield viscosity of the solution with a solids content of 6% is 760 mPa.s. at 20° C.

The product acts as a retention and/or thickening agent.

Example A.9

422 parts by weight of water
86 parts by weight of sodium sulphite, as well as
128 parts by weight of diacetone alcohol
are placed in the reaction vessel of Example A.1 and heated to 60° C., while stirring.

Subsequently, it is reacted, according to the method described in Example A.1, with 510 parts by weight of 30% formaldehyde solution from the storage vessel, followed by a thermal post-treatment of the batch at 95° C. for 2 hours. The resin solution must thereby be gradually diluted with, in all, 450 parts by weight of water according to the extent of the progress of the condensation.

After completion of the condensation, the pH is adjusted to 7.5 with sulphuric acid and the mixture is diluted with 300 parts by weight of water and cooled to ambient temperature. The resin solution has a solids content of 15.1% and a Brookfield viscosity of 2150 mPa.s.

For the production of the metal compound, the solution of the starting resin is heated to 95° C., 208 parts by weight of a 40% aqueous solution of sodium dichromate dihydrate are added thereto and the mixture is stirred for 2 hours at 95° C. The added amount of chromium salt corresponds to a content of 10% chromium, referred to the starting resin. The formation of the chromium compound takes place with a considerable viscosity increase so that, during the reaction, continuous dilution with hot water is necessary in order to maintain the stirrability of the batch. The amount of water needed for this purpose amounts, in all, to 1700 parts by weight.

The solution obtained of the chromium compound is cooled to ambient temperature and adjusted with 50% aqueous sodium hydroxide solution to pH 7.5. In the case of a solids content of 8.6%, its Brookfield viscosity is 3600 mPa.s.

The product has a thickening action, for example in aqueous solutions or clay suspensions.

Example A.10

In the reaction vessel of Example A.1, there is prepared a solution of 166 parts by weight of zinc oxide in 4400 parts by weight of a 60% aqueous citric acid solution. As soon as the zinc oxide has gone into solution, the pH is adjusted with 50% aqueous sodium hydroxide solution to 7.5.

Furthermore, to this batch are added:
2240 parts by weight of water
2333 parts by weight of sodium sulphite, as well as
3360 parts by weight of methyl ethyl ketone
and then heated, while stirring, to 70° C. Subsequently, it is reacted in the manner described in Example A.1 with 9333 parts by weight of a 30% formaldehyde solution, followed by a thermal post-treatment at 95° C. for 30 minutes. After cooling the solution, it is adjusted to a weakly alkaline pH value with 50% sulphuric acid.

The solution of the zinc compound has a solids content of 43% and a Brookfield viscosity of 40 mPa.s. The surface tension of a 1% dilution is 42 mN.m$^{-1}$.

The added zinc oxide corresponds to a content of 2%, referred to the ketone-aldehyde resin used.

The product is surface active and can be used, for example, for the introduction of air pores into mortar or concrete.

Example A.11

5973 parts by weight of water
2521 parts by weight of sodium sulphite
2403 parts by weight of acetophenone
2100 parts by weight of paraformaldehyde, as well as
280 parts by weight of acrolein
are placed in the stirrer container of Example A.1 in the given sequence and heated, while stirring, to 95° C., whereby a brown coloration of the reaction mixture takes place. As soon as the temperature of 95° C. is reached, the batch is subjected to a thermal treatment at 95° C. for 3 hours. In this way, resin solution is obtained with 50% solids content.

For conversion into the metal compound, the still hot and very alkaline-reacting solution of the starting resin is adjusted with sulphuric acid to a pH value of 2.5 and then a total of 199.6 parts by weight of iron powder are added portionwise thereto. The addition of the iron powder thereby takes place at such a speed that the gas and foam evolution involved with the dissolving process of the metal is not too vigorous. As soon as all the metal is dissolved, the batch is maintained for a further 2 hours at 95° C. and then cooled to ambient temperature.

The amount of iron metal added corresponds to a content of 3%, referred to the ketone-aldehyde resin.

The solution of the metal compound has a solids content of 45% and a Brookfield viscosity of 150 mPa.s. The surface tension of a 1% dilution is 48.7 mN.m$^{-1}$.

The product possesses surface-active properties and can be used, for example, for the production of foamed concrete.

Example A.12

A batch is prepared from
2300 parts by weight of water
6900 parts by weight of isopropanol
158 parts by weight of sodium sulphite
122 parts by weight of amidosulphonic acid
50 parts by weight of sodium hydroxide
960 parts by weight of furfurol
1280 parts by weight of octanal, as well as
500 parts by weight of acetylacetone
and heated in the apparatus according to Example A.1 for 12 hours, while stirring, at 85° C. An orange-brown resin solution is thereby formed with a solids content of 11.5%.

The starting resin is adjusted with sulphuric acid to a pH value of 2, 113 parts by weight of lead nitrate are added thereto and again boiled for 12 hours. Subsequently, the batch is adjusted with aqueous sodium hydroxide solution to a weakly alkaline pH value (8-9).

The addition of lead nitrate corresponds to an amount of 5%, referred to the resin used.

The solution of the metal compound is of low viscosity and has a solids content of 10%. The surface tension of a 1% dilution is 30 mN.m$^{-1}$.

The product has a surface activity and can be used, for example, for the production of microemulsions from water/oil mixtures.

B. Examples of Use

Example B.1

This Example describes the liquefying action of metal compounds according to the present invention on Portland cement slurries in comparison with a product based on a metal lignosulphonate compound.

Production and testing of the cement slurries took place according to the method described by L. M. Meyer and W. F. Perenchio in "Concrete International" (36-43, January, 1979) in which the cement slurries are subjected to a so-called "mini-slump test" and thus the liquefying action of an additive is assessed.

For carrying out the test, cement slurries with a Portland cement of strength class 35 F accoording to German Standard DIN 1164, were stirred up with a water-cement factor of 0.48, to give a homogeneous suspension and the diameter of the cement glue cake determined according to the above-cited method. The test was carried out with a cement slurry without additive as blank test, with a commercially available ferro-chromium compound of lignosulphonate and with the metal compounds according to the present invention of production Examples A.1 to A.6. As metal compound A.3, there was used here and in the following Examples in each case the iron chromium compound insofar as nothing otherwise is stated. In all cases, the solids dosaging of the additive was 0.3% by weight, referred to the amount of cement used. All additives were placed in the make-up water.

TABLE I

| Degree of spread out of cement slurries according to the "mini-slump test" | |
|---|---|
| additive | degree of spread out of cement glue cake (rel. %) |
| blank test | 100 |
| iron chromium lignosulphonate | 112 |
| A.1 | 141 |
| A.2 | 138 |
| A.3 | 143 |
| A.4 | 161 |
| A.5 | 130 |
| A.6 | 146 |

The results of Table I show that metal compounds according to the present invention give increases of the degree of spread out of the cement which far exceed those of the lignosulphonate product. Consequently, the metal compounds of ketone-aldehyde resins have a substantially better liquefying action in aqueous cement slurries.

EXAMPLE B.2

The Example describes the dispersion action of metal compounds according to the present invention on mortar.

According to German Standard DIN 1164, a mortar is prepared from Portland cement of strength class 45 F, standard sand and tap water, whereby, for the mixing up process, there is used the mixing programme RILEM-CEM corresponding to instructions of the Cembureau, Paris, and the degree of spread out of the so obtained mortar is determined according to DIN 1164, 1958 edition. The degree of spread out of this blank experiment without additive is taken as being equal to 100%.

In further experiments, using the same method, mortars were produced with, in each case, 1.0% by weight of solids dosaging of a commercially available iron chromium lignosulphonate, as well as of the metal compounds according to Examples A.1 to A.6 and their degree of spread out determined. The additives were, in the case of the mortar production, in each case placed in the make-up water.

The results given in Table II illustrate the superior dispersion action of the metal compounds according to the present invention in comparison with the lignosulphonate product.

TABLE II

Degree of spread-out of mortars with addition of lignosulphonate products and metal compounds according to the present invention

| additive | degree of spread out of mortar according to DIN 1164 (rel. %) |
|---|---|
| blank test | 100 |
| iron chromium lignosulphonate | 91 |
| A.1 | 136 |
| A.2 | 121 |
| A.3 | 116 |
| A.4 | 142 |
| A.5 | 119 |
| A.6 | 118 |

Example B.3

Metal compounds produced according to Examples A.1 to A.3 can be used for the production of flowing concrete according to the definitions of the "Richtlinien fur die Herstellung und Verarbeitung von Fliessbeton" ("Directions for the production and working up of flowing concrete") in the version of May, 1974, such as are cited, for example, in the periodical "Beton" 24 (1974) on pages 342 to 344.

Commercially available sodium lignosulphonate and iron chromium lignosulphonate also tested do not fulful the requirements mentioned in the directions for an additive for the production of liquid concrete.

Example B.4

This Example describes the use of metal compounds according to the present invention as water-reducing additives for mortar.

450 g. Portland cement of strength class 35 F according to German Standard DIN 1164, 1350 g. standard sand, as well as 229 g. of water are stirred up to give a mortar with the mixing programme RILEM-CEM of the Cembureau, Paris, and subsequently the degree of spread out and the 7 day strengths are determined according to DIN 1164. The strength value of the blank experiment is taken as being equal to 100%.

In further experiments, mortars are produced with, in each case, 1.0% by weight of solids dosaging of additive, dissolved in the make-up water, the amount of make-up water being so chosen that the mortar with additive possesses the same degree of spread out as the mortar of the blank experiment. The procedure permits, according to the relationship:

$$\left(1 - \frac{\text{water-cement factor of the mortar with additive}}{\text{water-cement factor of the mortar of the blank experiment}}\right) \times 100\%$$

the calculation of the water saving which can be achieved when using an additive.

The results summarised in Table III show that metal compounds according to Examples A.1 to A.3 have a drastically higher water-reducing action in mortars than a comparable commercially available metal compound of lignosulphonate. The higher water reduction of the metal compounds based on ketone-aldehyde results in a corresponding increase of the mortar strengths, for example after 7 days.

TABLE III

Water reduction and strength development of mortars with metal compounds based on ligno-sulphonate or ketone/aldehyde as additives

| additive | water-cement factor | water saving (%) | 7 day strengths flexural tensile strength (%) | compressive strength (%) |
|---|---|---|---|---|
| blank test | 0.510 | — | 100 | 100 |
| iron chromium ligno-sulphonate | 0.505 | 1.0 | 85 | 59 |
| A.1 | 0.451 | 11.6 | 135 | 122 |
| A.2 | 0.460 | 10.0 | 129 | 118 |
| A.3 | 0.463 | 9.2 | 121 | 115 |

Example B.5

The following experiment demonstrates the superior action of the metal compounds according to the present invention in the case of the viscosity lowering of oil well cement slurries:

Cement slurries are prepared according to the directions laid down by the American Petroleum Institute (API) in Specification 10, "API Specification for Materials and Testing for Well Cements", edition of January, 1982, from an oil well cement of API Class G with a water-cement factor of 0.44 and the slurry viscosities are measured on a Fann viscosimeter (Model 35 SA, Rotor Bob R 1 B 1) at 600 r.p.m. The measurement at this shear speed gives a good picture of the slurry viscosity or of its flow behaviour occurring in a drill hole in the case of the turbulent pumping of the cement slurries.

For the investigation of the viscosity-lowering action of additives according to the present invention, the slurry described above for the blank experiment without additive, carried out at a temperature of 38° C., was mixed, in each case, with 0.75% by weight of a commercially available sodium lignosulphonate, of a ferro-chromium lignosulphonate, as well as of metal compounds according to Examples A.1 to A.3. The additives are thereby dissolved in the make-up water and their dosagings apply as solid material dosagings insofar as they are used as a solution. The viscosities of slurries with additives, measured according to the API directions, are calculated in percent of the viscosity of the blank experiment.

Since, in the case of bore hole cementation, increased temperatures arise and salts, such as sodium chloride, are admixed with the cements, the action of the additives was also tested on a cement slurry which has been produced at 60° C. with the use of an 18% aqueous sodium chloride solution as make-up water.

TABLE IV
Viscosity of oil well cement slurries with viscosity-lowering additives

| cement slurry type[+] | temperature (°C.) | salt content in the make-up water (%) | additive | relative slurry viscosity (%), measured with the Fann Viscosimeter at 600 r.p.m. |
|---|---|---|---|---|
| I | 38 | — | — | 100 |
| I | 38 | — | sodium lignosulphonate | 65 |
| I | 38 | — | iron-chromium lignosulphonate | 64 |
| I | 38 | — | A.1 | 39 |
| I | 38 | — | A.2 | 38 |
| I | 38 | — | A.3 | 40 |
| II | 60 | 18 | — | 100 |
| II | 60 | 18 | sodium lignosulphonate | 117 |
| II | 60 | 18 | iron-chromium lignosulphonate | 155 |
| II | 60 | 18 | A.1 | 70 |
| II | 60 | 18 | A.2 | 62 |
| II | 60 | 18 | A.3 | 58 |

[+]Cement slurry Type I = fresh water as make-up water
Type II = 18% aqueous sodium chloride solution as make-up water The results summarised in Table IV show that metal compounds according to the present invention effectively lower the viscosity of oil well cement slurries over a wide temperature range and in the presence of high salt concentrations, whereas products based on lignosulphonate only show small effects.

Example B.6

This Example describes the improvement of the dispersion action which metal compounds according to the present invention show in comparison with the pure ketone-aldehyde starting resins on fresh water drilling muds.

For the testing, there is first prepared a fresh water drilling mud by stirring 75 parts by weight of a bentonite, which corresponds to the requirements of OCMA Specification DFCP-4, into 1000 parts by weight of tap water and stirring this suspension for 24 hours. The mud so obtained is used as base mud for the further experiments.

For the testing of the dispersing action of additives, in each case, 350 parts by weight of the above fundamental rinsing are mixed with 1.75 parts by weight of the powdery additive and mixed in a Hamilton Beach mixer for 5 minutes at stage "high". Subsequently, using a Fann viscosimeter (Model 35 SA; Rotor Bob R1 B1), there are determined the flow curves and initial and 10 minute gel strengths of the mud at ambient temperature according to the test directions recommended by the American Petroleum Institute (API) and laid down in the publication "Recommended practice for Standard procedure for Testing Drilling Fluids" (API RP 13 B; 9th edition, May, 1982). From the values of the flow curve are calculated as follows the important values "apparent viscosity" and "yield point", which are important for the assessment of the dispersion of the mud, according to the Bingham model:

$$\text{apparent viscosity (mPa.s)} = \frac{\text{Fann value at 600 r.p.m.}}{2}$$

yield point (lbs/100 ft$^2$) = 2 × Fann value at 300 r.p.m. − Fann value at 600 r.p.m.

As additives, there were used, in each case, the pure ketone-aldehyde resins described in Examples A.1 to A.6, as well as the metal compounds obtained from these resins by reaction with metal salts. All the additives were added in the form of powders which were obtained by spray drying from solutions produced according to A.1 to A.6.

Table V summarises the experimental results obtained. For making clear the improvement which occurs in the action of the ketone-aldehyde resins after reaction to give the metal compounds, the measurement values of the mud with the pure resins were, in each case, made equal to 100% and the measurement values of the muds with the metal compounds referred thereto. According to this representation, it can, for example, be seen that by the addition of metal compounds instead of the ketone-aldehyde starting resins, a reduction of the apparent viscosity of up to 81%, of the yield point of up to 93% and of the initial or 10 minute gel strength of 98% and 70%, respectively, are possible. The thus achievable drastic improvement of the rheological properties of a fresh water-clay mud demonstrates the superiority of the metal compounds according to the present invention in comparison with the ketone-aldehyde resins.

TABLE V
Rheological properties of a fresh water-drilling mud with addition of ketone-aldehyde resins and of their metal compounds

| product according to Example | additive | apparent viscosity (rel. %) | yield point (rel. %) | initial gel strength (rel. %) | 10 min. gel strength (rel. %) |
|---|---|---|---|---|---|
| A.1 | resin[+] | 100 | 100 | 100 | 100 |
| A.1 | metal compound[+] | 57 | 44 | 63 | 89 |
| A.2 | resin | 100 | 100 | 100 | 100 |
| A.2 | metal compound | 58 | 42 | 81 | 86 |
| A.3 | resin[+] | 100 | 100 | 100 | 100 |
| A.3 | metal compound[+] | 19 | 7 | 2 | 30 |
| A.4 | resin[+] | 100 | 100 | 100 | 100 |
| A.4 | metal compound[+] | 56 | 47 | 87 | 74 |
| A.5 | resin[+] | 100 | 100 | 100 | 100 |
| A.5 | metal compound[+] | 38 | 25 | 56 | 79 |
| A.6 | resin[+] | 100 | 100 | 100 | 100 |
| A.6 | metal compound[+] | 40 | 26 | 21 | 39 |

[+]In the case of these experiments, for the adjustment of a suitable pH value, 1.75 parts by weight of 50% aqueous sodium hydroxide solution were added to the rinsing.

Example B.7

The dispersion action of metal compounds according to the present invention on a fresh water drilling mud, which is inhibited with small amounts of sodium or calcium salts or is loaded with barium sulphate, is shown by the following experiments:

350 parts by weight of the fresh water base mud of Example B.6 are mixed with 14 parts by weight of sodium chloride for 5 minutes in a Hamilton Beach mixer at stage "high". The drilling mud so obtained is inhibited with 4% sodium chloride.

A further 350 parts by weight of the base mud of Example B.6 are stirred with 7 parts by weight of gypsum for 5 minutes in a Hamilton Beach mixer. From this results a 2% gypsum-clay mud.

Another 350 parts by weight of the base mud of Example B.6 are stirred on a Hamilton Beach mixer for 5 minutes with 560 parts by weight of a pearl white (barium sulphate) which corresponds to the OCMA Specification DFCP-3, there thus being obtained a mud with a density of 1.92 g./ml. containing 1600 g. BaSO$_4$/liter.

These muds inhibited or loaded with salts are now, in each case, mixed with 3.5 parts by weight, referred to the fresh water base mud used, of metal compounds according to Examples A.1 to A.3, also for 5 minutes in a Hamilton Beach mixer and subsequently the rheological properties of the muds are determined by the method described in Example B.6. The additives according to A.1 to A.3 are used in the form of powders which are obtainable from the solutions by spray drying.

The results given in Table VI demonstrate the good thinner action of the metal compounds according to the present invention in comparison with the inhibited or loaded fresh water drilling muds without additives.

TABLE VI

Rheological properties of drilling muds with sodium chloride, gypsum and barium sulphate in the case of the addition of metal compounds

| fresh water-clay mud with | addition of metal compound according to Example | apparent viscosity (rel. %) | yield point (rel. %) | initial gel strength (rel. %) | 10 min. gel strength (rel. %) |
|---|---|---|---|---|---|
| 4% NaCl | — | 100 | 100 | 100 | 100 |
| 4% NaCl | A.1+ | 88 | 81 | 79 | 90 |
| 4% NaCl | A.2 | 33 | 18 | 60 | 93 |
| 4% NaCl | A.3+ | 29 | 12 | 12 | 40 |
| 2% gypsum | — | 100 | 100 | 100 | 100 |
| 2% gypsum | A.1+ | 33 | 13 | 4 | 75 |
| 2% gypsum | A.2 | 50 | 33 | 54 | 96 |
| 2% gypsum | A.3+ | 19 | 10 | 4 | 18 |
| 1600 g./l. barytes | — | 100 | 100 | 100 | 100 |
| 1600 g./l. barytes | A.1+ | 37 | 76 | 91 | 89 |
| 1600 g./l. barytes | A.2 | 24 | 36 | 31 | 83 |
| 1600 g./l. barytes | A.3+ | 14 | 9 | 7 | 35 |

TABLE VI-continued

Rheological properties of drilling muds with sodium chloride, gypsum and barium sulphate in the case of the addition of metal compounds

| fresh water-clay mud with | addition of metal compound according to Example | apparent viscosity (rel. %) | yield point (rel. %) | initial gel strength (rel. %) | 10 min. gel strength (rel. %) |
|---|---|---|---|---|---|
| barytes | | | | | |

+For the adjustment of a suitable pH value, the muds were mixed with an additional 1.75 parts by weight of 50% aqueous sodium hydroxide solution.

Example B.8

Metal compounds of the present invention can also be used for the dispersion of muds based on a salt water-clay.

As base muds, there are prepared two salt water-clay muds by introducing, in each case, 64 parts by weight of attapulgite, which corresponds to OCMA Specification DFCP-1, into 1000 parts by weight of an artificial seawater according to German Standard DIN 50 900 or into the same amount of a potassium chloride solution saturated at 20° C. and the suspensions are stirred for 2 days. The so obtained salt water-base muds are mixed up for 5 minutes in a Hamilton Beach mixer at stage "high" before the determination of their rheological properties.

For testing the thinning action of additives according to the present invention, the above base muds are mixed with, in each case, 1.0% by weight of the powdered metal compounds from Examples A.1 to A.3 and mixed for 5 minutes in a Hamilton Beach mixer at stage "high".

Table VII shows the outstanding improvement of the mud rheology which can be achieved with products according to the present invention:

TABLE VII

Lowering of the apparent viscosity, yield point and gel strength of salt water-clay muds by metal compounds

| salt water-clay mud based upon | additive according to production Example | apparent viscosity (rel. %) | yield point (rel. %) | initial gel strength (rel. %) | 10 min. gel strength (rel. %) |
|---|---|---|---|---|---|
| seawater | — | 100 | 100 | 100 | 100 |
| seawater | A.1* | 17 | 5 | 20 | 50 |
| seawater | A.2 | 15 | 2 | 10 | 50 |
| seawater | A.3* | 10 | 2 | 20 | 29 |
| saturated KCl solution | — | 100 | 100 | 100 | 100 |
| saturated KCl solution | A.1* | 10 | 2 | 5 | 21 |
| saturated KCl solution | A.2 | 6 | 4 | 5 | 4 |
| saturated KCl solution | A.3* | 10 | 2 | 5 | 17 |

*Muds were adjusted to a suitable pH value by addition of 0.5 wt. percent of 50% aqueous sodium hydroxide solution.

Example B.9

The conversion of the ketone-aldehyde resins into metal compounds brings about, in general, a considerable improvement of the effectiveness of these additives when used at an elevated temperature. This can be shown as follows, using the example of fresh water-clay mud which have been aged at 204° C.:

The fresh water base mud of Example B.6 is mixed with, in each case, 3.0% by weight of the powdered pure ketone-aldehyde resins and of their metal compounds according to Examples A.3 and A.5 and mixed for 5 minutes in a Hamilton Beach mixer at stage "high". Subsequently, in each case, 450 ml. of these muds are placed into 500 ml. ageing cells which are then closed and the cells are rolled for 24 hours in a roller oven with 204° C. inner temperature. After ageing is finished, the cells are taken out of the oven, cooled within 2 hours to ambient temperature and, after 5 minutes mixing in a Hamilton Beach mixer, measurement of the rheological properties of the muds are carried out in a Fann apparatus.

The results summarised in Table VIII demonstrate that the dispersing action of metal compounds according to the present invention, in the case of use at an elevated temperature, is generally better than that of the pure ketone-aldehyde starting resins.

TABLE VIII

Comparison of the effectiveness of ketone-aldehyde resins and of their metal compounds on thermally-treated fresh water drilling muds.

| product according to Example | additive | dosaging (%) | thermal treatment | apparent viscosity (rel. %) | yield point (rel. %) | initial gel strength (rel. %) | 10 min. gel strength (rel. %) |
|---|---|---|---|---|---|---|---|
| A.3 | resin | 3.0 | 204° C./24 h. | 100 | 100 | 100 | 100 |
| A.3 | metal compound | 3.0 | 204° C./24 h. | 63 | 54 | 41 | 40 |
| A.5 | resin | 3.0 | 204° C./24 h. | 100 | 100 | 100 | 100 |
| A.5 | metal compound | 3.0 | 204° C./24 h. | 59 | 85 | 100 | 21 |

Example B.10

This Example describes the thermostability of dispersion agents according to the present invention based upon metal compounds in the case of salt water-clay muds aged at 177° C.

In each case, 350 parts by weight of the salt water base muds of Example B.8 are mixed with 10.5 parts by weight of the powdered metal compounds according to Examples A.1 to A.3 and subsequently subjected to a 24 hour ageing test as described in Example B.9, the temperature in the roller oven thereby being 177° C. (350° F.).

The results given in Table IX show that metal compounds based on ketone-aldehyde resins are also effective viscosity reducers in temperature-treated salt muds.

Example B.11

Metal compounds based on ketone-aldehyde can be better used for the thinning of invert emulsion drilling fluids than the corresponding compounds based on lignosulphonate. This is demonstrated by the following experiments:

There is first prepared an initial mud by stirring for 5 minutes in a Hamilton Beach mixer 227.5 parts by weight of diesel oil with 122.5 parts by weight of the fresh water base mud of Example B.6. Subsequently, the rheological properties of this water-in-oil emulsion are determined by the test instruction RP 13 B recommended by the American Petroleum Institute ("Recommended practice for Standard Procedure for Testing Drilling Fluids", 9th edition, May, 1982).

For testing the effectiveness of metal compounds according to the present invention, in each case, 350 parts by weight of the above initial mud are mixed with 1.75 parts by weight of the following additives: acetone-formaldehyde resin according to Example A.3, iron chromium compound according to Example A.3, as well as a commercially available iron chromium lignosulphonate. The muds are produced in two experimental series at 20° and 80° C. and measured at these temperatures on a Fann apparatus with thermocup.

The experimental results given in Table X show that the iron chromium compound based on acetone-formaldehyde is substantially better suited for the improvement of the rheological properties of a drilling fluid than the iron chromium compound of lignosulphonate or the iron-chromium-free acetone-formaldehyde starting resin. This finding also applies to the action at an elevated temperature, for example 80° C.

TABLE IX

Viscosity lowering by metal compounds of salt water-clay muds aged at 177° C.

| salt water-clay mud based upon | metal compound according to Example | apparent viscosity (rel. %) | yield point (rel. %) | initial gel strength (rel. %) | 10 min. gel strength (rel. %) |
|---|---|---|---|---|---|
| seawater | blank experiment | 100 | 100 | 100 | 100 |
| seawater | A.1 | 33 | 27 | 30 | 36 |
| seawater | A.2 | 14 | 3 | 10 | 9 |
| seawater | A.3 | 19 | 3 | 20 | 27 |
| saturated KCl solution | blank experiment | 100 | 100 | 100 | 100 |
| saturated KCl solution | A.1 | 22 | 3 | 14 | 22 |
| saturated KCl solution | A.2 | 22 | 3 | 7 | 22 |
| saturated KCl solution | A.3 | 14 | 3 | 7 | 22 |

TABLE X

Rheological data of an invert emulsion drilling fluid with additives at +20° C. and +80° C.

| additive | drilling fluid temperature (°C.) | rheological data of the invert emulsion drilling fluid | | | |
|---|---|---|---|---|---|
| | | plastic viscosity (mPa.s) | yield point (lbs/100 ft²) | gel strength (lbs/100 ft²) | |
| | | | | initial value | 10 min. value |
| blank experiment | 20 | 62 | 83 | 30 | 39 |
| resin according to A.3 | 20 | 57 | 48 | 29 | 30 |
| iron-chromium compound according to A.3 | 20 | 26 | 21 | 3 | 10 |
| iron-chromium ligno-sulphonate | 20 | 54 | 52 | 8 | 21 |
| blank experiment | 80 | 54 | 101 | 32 | 35 |
| resin according to A.3 | 80 | 42 | 78 | 32 | 35 |
| iron-chromium compound according to A.3 | 80 | 15 | 14 | 6 | 11 |
| iron-chromium ligno-sulphonate | 80 | 28 | 15 | 14 | 20 |

Example B.12

The retention of the water used for the make-up of a mortar or cement mixture is frequently a problem in the constructional industry. For example, in the case of underwater concreting, the concrete is introduced in free fall under water into the casing, whereby, if possible, no washing out and breakdown of the concrete is to occur since otherwise the necessary high strengths are not achieved and the turbidity of the water caused by floated out particles makes the concreting work difficult. These unfavourable effects can, in general, be overcome by the addition of retention agents to the concrete or mortar mixture.

The following experiments show that metal compounds according to the present invention possess the retention action required for the problems in question, such as underwater concreting:

100 parts by weight of a homogeneous dry mixture of 450 parts by weight of Portland cement of the strength class Z 45 F according to German Standard DIN 1164 and 1.350 g. of sand, also according to DIN 1164, are intimately stirred for 1 minute in a porcelain dish with the amount of water which is necessary in order later to obtain from the mortar a compact sphere with good cohesion, subsequently left for 10 minutes and then again intensively stirred up for 1 minute. From the so obtained mortar is shaped a sphere and its weight is determined. This sphere is allowed to fall in a 1 liter measuring cylinder, which is filled with tap water up to the 1 liter mark and has a height of 33 cm. and a diameter of 6 cm., through the water to the bottom of the measurement cylinder. The measuring cylinder is inverted and the sphere is allowed to fall back to the opening of the measurement cylinder closed with a hand and then taken out. By weighing of the sphere, there is ascertained the weight loss in comparison with the sphere before the dropping experiment.

A mortar with a good water-retaining ability shows a minimum weight loss due to floating out or giving up water. Furthermore, the water in the measurement cylinder remains substantially clear during the dropping of the sphere.

For testing the action of additives according to the present invention, mortars are produced according to the above-described method in the case of which, in each case, 0.375 parts by weight of the powdered additives according to Examples A.8 and A.9 were dissolved in the make-up water and, with mortar spheres produced therefrom, the dropping experiment was carried out in the 1 liter measuring cylinder.

The results given in Table XI show that, with metal compounds according to Examples A.8 to A.9, mortars can be obtained with a good water-retention ability.

TABLE XI

Water-retention ability of mortars with addition of metal compounds in the case of the dropping experiment in water.

| additive according to Example | amount of water for the production of a compact sphere (wt. parts) | weight loss of the mortar sphere in the case of the dropping experiment (% referred to initial weight) | mortar sphere after dropping experiment | turbidity of the water after dropping experiment |
|---|---|---|---|---|
| blank experiment | 13 | 30 | broken down | very strong |
| A.8 | 11 | 4 | compact | slight |
| A.9 | 13 | 3 | compact | none |

Example B.13

Metal compounds produced according to Examples A.8 and A.9 also make possible the preparation of mortars or cement glues with a high water-retention ability, such as are used, for example, for wall plaster or sealing compounds.

This is demonstrated by experimental stickings of foamed concrete cubes with cement glues to which are added the metal compounds according to the present invention.

A cement glue is first produced by intimately mixing for 1 minute 100 parts by weight of Portland cement of strength class 35 F according to DIN 1164, as well as 36 parts by weight of water and this cement glue is then applied uniformly to the side surface of an foamed concrete cube with an edge length of 4 cm. and a specific weight of 0.60 g./cm³. Subsequently, a further foamed concrete cube is pressed with its side face on to the cement glue and left to stand for 24 hours. After this time, it is tested whether the adhesion of the two foamed concrete cubes by the cement glue is firm or whether, by pressing, breakage occurs in the joint.

Cement glues with good water retention do not give up any water to the absorbent foamed concrete and show, therefore, a firm adhesion.

If the above-described experiment is carried out without an additive in the cement glue, then both foamed concrete cubes can be separated by light pressure. The adhesion does not hold because the water has been sucked out of the cement glue into the porous foamed concrete adhesion base and the cement could no longer harden completely. On the other hand, in the case of an addition of 1.0% by weight, referred to the amount of cement in the cement glue, of the powdered metal compounds according to Examples A.8 or A.9, the adhesion does not break even in the case of strong pressure since the water has remained in the cement glue.

Example B.14

The following Example demonstrates how, from a metal compound with dispersion properties, by further reaction with a higher valency metal ion, for example hexavalent chromium, additional retention properties can be achieved:

According to the process described in Example B.5, cement slurries are prepared from an oil well cement of API class G with a water-cement factor of 0.44 and the slurry viscosities are measured on a Fann viscosimeter (Model 35 SA, Rotor-Bob R1B1). Subsequently, the same cement slurries are again prepared and a determination of the high pressure water loss of the cement slurries is carried out according to the test directions of API Specification 10, edition January, 1982, at a temperature of 38° C. and a pressure of 1000 psi.

These tests were first carried out with a cement slurry without additive as a blank experiment and subsequently with, in each case, 1.5% by weight of the powdered iron or iron-chromium compound according to Example A.3 and with a commercially-available iron-chromium compound based on lignosulphonate, as additives. In the case of these tests, the additives were mixed dry into the cement.

The results given in Table XII demonstrate that the iron compound according to Example A.3 admittedly very well disperses the cement slurries but, in the case of the fluid loss experiment, does not display a sufficient filtrate-reducing action. The iron-chromium compound produced with the iron compound simultaneously possesses very good dispersion and filtrate-control properties. On the other hand, a commercially-available iron-chromium lignosulphonate compound tested as comparative product displays only a modest dispersion and filtrate-control action.

TABLE XII

Dispersion and filtration-control of metal compounds on oil well cement slurries.

| additive | apparent viscosity of the cement slurries (mPa.s) | API-filtrate at 1000 psi pressure in 30 minutes (ml) |
| --- | --- | --- |
| blank experiment | 58.5 | 1559* |
| iron compound according to Example A.3 | 26 | 254 |

TABLE XII-continued

Dispersion and filtration-control of metal compounds on oil well cement slurries.

| additive | apparent viscosity of the cement slurries (mPa.s) | API-filtrate at 1000 psi pressure in 30 minutes (ml) |
| --- | --- | --- |
| iron-chromium compound according to Example A.3 | 24 | 28 |
| iron-chromium lignosulphonate | 38 | 508* |

*Calculated filtrate volume since complete water loss occurred before the end of the 30 minute filtration experiment.

Example B.15

Metal compounds according to the present invention act on fresh water-clay muds as outstanding water-retention agents, even after aging of the muds in the temperature range of up to almost 300° C. This is demonstrated by the following experiments with a field mud from a drilling rig in a south German location.

In the case of a natural gas drilling in Aquitaine formation, at a depth of 2600 meters there was used a fresh water mud from local spring water with a calcium content of 30°dH and 5% by weight of a fresh water-clay according to OCMA Specification DFCP-4. Due to downhole contamination, the mud received 0.3% by weight of sodium chloride. For the filtrate control, there were used 2.0% by weight of a low viscosity, substantially sodium chloride-free carboxymethylcellulose. At 115° C. BHST, in spite of biocide addition, the mud showed a strong diminution of the fluid loss value which also could not be improved by a drastically increased CMC addition.

The filtrate control of this mud is possible with the metal compound according to Example A.7 as follows:

In each case, 450 parts by weight of the above CMC-containing drilling mud are mixed for 20 minutes in a Hamilton Beach mixer at stage "high" with 13.5 parts by weight of powdered metal compound according to A.7, then placed in a 500 ml. ageing cell and subjected to 24 hours ageing experiments at 120, 177 and 300° C. in the manner described in Example B.9. Subsequently, on the muds cooled to ambient temperature, there is carried out a fluid loss determination according to API RP 13 B at 100 psi pressure.

The results given in Table XIII show that metal compounds of the present invention according to Example A.7 can be used for filtrate control in fresh water muds.

TABLE XIII

Filtration control of the metal compound according to Example A.7 on aged fresh water drilling muds of a south German oil rig

| addition to the chilling mud | ageing conditions of the mud | filtrate value (rel. %) after 30 minutes |
| --- | --- | --- |
| blank experiment | 120° C./24 hours | 100 |
| A.7 | 120° C./24 hours | 50 |
| blank experiment | 177° C./24 hours | 100 |
| A.7 | 177° C./24 hours | 42 |
| blank experiment | 300° C./24 hours | 100 |
| A.7 | 300° C./24 hours | 12 |

Example B.16

The suitability of the iron-chromium compound of Example A.3 for filtrate control of a salt water-clay mud is explained in the following:

In each case, 350 parts by weight of the seawater and potassium chloride muds described in Example B.8 with attapulgite as clay mineral are mixed with 1.5% by weight of the additive according to Example A.3, mixed for 5 minutes at stage "high" in a Hamilton Beach mixer and subsequently tested at 100 psi pressure and ambient temperature for its filtrate value after 30 minutes according to API RP 13 B. The filtrate values obtained are compared with the filtrate of the initial muds without additive.

For the testing of the effectiveness in the case of thermo-treated muds, the above muds are mixed with 3.0% by weight of the additive according to Example A.3 and a 24 hour aging of the muds carried out at 177° C. in a roller oven (method see Example B.9).

The results given in Table XIV make clear the suitability of an additive according to the present invention for filtration control in salt water-clay muds up to a temperature of at least 177° C.

TABLE XIV

Filtration control of salt water-clay mud by addition of the metal compound according to Example A.3.

| mud based on | addition of A.3 (wt. %) | ageing of the mud | API filtrate at 100 psi in 30 min. (rel. %) |
|---|---|---|---|
| seawater | — | — | 100 |
| seawater | 1.5+ | — | 7 |
| seawater | — | 177° C./24 h. | 100 |
| seawater | 3.0+ | 177° C./24 h. | 14 |
| saturated KCl solution | — | — | 100 |
| saturated KCl solution | 1.5+ | — | 14 |
| saturated KCl solution | — | 177° C./24 h. | 100 |
| saturated KCl solution | 3.0+ | 177° C./24 h. | 37 |

+ for the adjustment of a suitable pH value, these muds were additionally mixed with 1.75 parts by weight of 50% aqueous sodium hydroxide solution.

EXAMPLE B.17

The action of metal compounds according to the present invention as thickening agents is shown in the following experiments:

The solutions of the starting resins and metal compounds according to Examples A.8 and A.9 are diluted to a solids content of 3.0% by weight, thermo-stated to 20° C. and subsequently their viscosity determined in a Ubbelohde viscosimeter.

The experimental results given in Table XV show that by conversion of the ketone-aldehyde starting resins according to Examples A.8 and A.9 into metal compounds, considerable increases of the viscosities are achieved.

TABLE XV

Viscosity of aqueous solutions of ketone-aldehyde resins and metal compounds according to Examples A.8 and A.9.

| thickening agent | Ubbelohde viscosity at 20° C. (rel. %) |
|---|---|
| ketone-aldehyde resin according to Example A.8 | 100 |
| metal compound according to Example A.8 | 258 |
| ketone-aldehyde resin according to Example A.9 | 100 |
| metal compound according to Example A.9 | 223 |

EXAMPLE B.18

This Example demonstrates the thickening action of the metal compound of Example A.9 also after temperature and shear treatment and after a pH value change of the solution.

(a) Temperature treatment.

The Ubbelohde viscosity is determined at 20° C. of a 3.0% solution of the metal compound according to Example A.9.

Subsequently, the solution is stored in a tightly closed vessel for 24 hours at 80° C., cooled to 20° C. and the viscosity again measured.

A comparison of the viscosity values before and after the temperature treatment given in Table XVI shows that the thickening agent suffers no loss of activity.

(b) Shear treatment.

100 parts by weight of a 3.0% solution of the metal compound according to Example A.9 are mixed for 5 minutes in the 250 ml. beaker of a Waring mixing apparatus according to API Specification 10, edition of January, 1982, Section 5 ("Preparation of Slurry") at a stirrer speed of 8000 r.p.m. and subsequently the viscosity is measured at 20° C.

A comparison of the viscosities of the starting solution and of the shear-treated solution given in Table XVI clearly demonstrates the shear-stability of the thickening agent according to the present invention.

(c) Viscosity in dependence upon the pH value.

In each case 100 parts by weight of a 3.0% solution of the metal compound according to Example A.9 are adjusted with sulphuric acid or aqueous sodium hydroxide solution to a pH value of 2, 4, 10 or 13 and subsequently their viscosities are measured according to Ubbelohde at 20° C.

A comparison of the measured viscosity values with those of the parent solution adjusted to pH 7 given in Table XVI shows that the thickening action of the metal compound according to the present invention in the pH value range from strongly acidic to strongly alkaline is constant.

TABLE XVI

Viscosity of an aqueous solution of the metal compound of Example A.9 after temperature and shear treatment and pH value adjustment.

| treatment of the solution with thickening agent according to Example A.9 | Ubbelohde viscosity at 20° C. (rel. %) |
|---|---|
| starting solution | 100 |
| 24 hr. storage at 80° C. | 101 |
| 5 minutes at 8000 rpm in Waring blender shearing | 101 |
| adjusted to pH = 2 | 100 |
| adjusted to pH = 4 | 100 |
| adjusted to pH = 10 | 99 |

TABLE XVI-continued

Viscosity of an aqueous solution of the metal compound of Example A.9 after temperature and shear treatment and pH value adjustment.

| treatment of the solution with thickening agent according to Example A.9 | Ubbelohde viscosity at 20° C. (rel. %) |
|---|---|
| adjusted to pH = 13 | 100 |

EXAMPLE B.19

The thickening agent of the present invention according to Example A.9 can also be used for increasing the viscosity of clay suspensions, for example in so-called low solid non-dispersed muds.

According to the process method described in Examples B.6 and B.8, two base muds are prepared which contain 4% by weight of bentonite in fresh water or 4% by weight of attapulgite (SWDC) in seawater and the apparent viscosity and yield point are determined in a Fann apparatus.

To, in each case, 350 parts by weight of the two base muds are mixed 7 parts by weight of the powdered additive according to Example A.9 for 20 minutes on a Hamilton Beach mixer at stage "high" and the rheology of the muds with thickening agents determined as in the case of the two base muds without addition.

The results summarised in Table XVII clearly show the viscosity increase which can be achieved in low solids fresh and seawater muds with the thickening agent according to Example A.9.

TABLE XVII

Viscosity increase of fresh and salt water muds by addition of the thickening agent according to Example A.9.

| | | rheological properties of the muds | |
|---|---|---|---|
| mud type | additive | apparent viscosity (rel. %) | yield point (rel. %) |
| sweet water-bentonite | — | 100 | 100 |
| sweet water-bentonite | metal compound according to A.9 | 168 | 168 |
| seawater-SWDC | — | 100 | 100 |
| seawater-SWDC | metal compound according to A.9 | 136 | 141 |

EXAMPLE B.20

The suitability of a surface-active metal compound for directed air-entrainment into mortar can be shown as follows:

According to German Standard DIN 1164, there is prepared a standard mortar from Portland cement of the strength class 35 F, standard sand and tap water, whereby, for the mixing up process, there is used the mixing programme RILEM-CEM according to instructions of the Cembureau, Paris, and the air pore content of the mortar adjusted to a degree of spread-out of 18 cm. is determined according to DIN 1164 in volume percent.

For testing an air-entraining action of an additive according to the present invention, standard mortars are prepared with 0.01, 0.02 and 0.05% by weight of additive, referred to the amount of cement in the mortar, of powdered metal compound according to Example A.10 and the air pore content determined as in the blank experiment on a mortar adjusted to a degree of spread-out of 18 cm. The additive is completely dissolved in the make-up water before mixing the mortar.

The experimental results given in Table XVIII demonstrate that, with very small dosages of surface-active metal compounds according to the present invention, high air pore contents can be introduced into building material mixtures, for example mortar.

TABLE XVIII

Air-entraining of the surface-active metal compound according to Example A.10 into standard mortar

| addition of metal compound according to Example A.10 (wt. %) | air pore content in the standard mortar (vol. %) |
|---|---|
| blank experiment | 5.4 |
| 0.01 | 13.8 |
| 0.02 | 20.5 |
| 0.05 | 30.0 |

EXAMPLE B.21

This Example describes the production of foamed concrete with a surface-active metal compound according to the present invention.

A 1% solution of the metal compound according to Example A.11 is foamed by means of a commercially-available foaming apparatus to a foam with an average density of 0.1 g./cm$^3$ and stirred into a mixture of 300 kg. Portland cement 45 F, 600 kg. fine sand (particles size 0 to 1 mm.) and 120 kg. water. The foamed concrete so produced has a fresh raw density of 0.92 g./cm$^3$.

EXAMPLE B.22

The use of a surface-active metal compound for the emulsification of oil/water mixtures is explained in the following experiment:

In five 250 ml. glass flasks, in each case 50 parts by weight of a 1% aqueous solution of the surface-active metal compound according to Example A.12 are covered with the following components:
 (a) 50 parts by weight of a paraffin-based oil
 (b) 50 parts by weight of a naphthene-based oil
 (c) 25 parts by weight of hexanol and 50 parts by weight of paraffin-based oil
 (d) 25 parts by weight of isopropanol and 50 parts by weight of aromatic oil.

The water/oil and water/alcohol/oil mixtures are vigorously shaken by hand for 20 seconds, micro-emulsions thereby resulting. Subsequently, the flasks are left to stand quietly and the time is measured up to which the oil phase again separates from the water phase.

The results given in Table XIX clearly show that water/oil and water/alcohol/oil mixtures can be converted into stable microemulsions by the addition of surface-active agents according to the present invention, the emulsifying action thereby being especially favourable in the presence of a co-tenside, for example of an alcohol.

TABLE XIX

Stability of water/oil or water/alcohol/oil emulsions in the case of adding the metal compound according to Example A.12.

| emulsion of | stability of the microemulsions (h:min) |
|---|---|
| water/paraffin oil | 0:45 |

TABLE XIX-continued

Stability of water/oil or water/alcohol/oil emulsions in the case of adding the metal compound according to Example A.12.

| emulsion of | stability of the microemulsions (h:min) |
| --- | --- |
| water/hexanol/paraffin oil | >24 h. |
| water/naphthene oil | 0:45 |
| water/isopropanol/aromatic oil | >24 h. |

We claim:

1. Metal compounds of acid group-containing condensation products or co-condensation products of ketones and aldehydes, obtainable by the reaction of acid group-containing ketone-aldehyde condensation products and/or co-condensation products with mono- or polyvalent metal compounds and/or metal complex compounds of metals of Groups IIIA to VIIIA and/or IB to VB of the Periodic System.

2. The metal compounds according to claim 1, wherein the mono- or polyvalent metal compounds and/or metal complex compounds are added to the finished condensation products or co-condensation products of ketones and aldehydes are added into a process step of the production of the condensation products or co-condensation products.

3. The metal compounds according to claim 1, wherein the ketone-aldehyde co-condensation products are co-condensates of ketones and aldehydes with acid group-introducing compounds and with aminoplast formers and/or aromatic compounds and/or condensation products thereof and/or with lignin sulphonate resins and/or with cellulose derivatives.

4. The metal compounds according to claim 1, wherein the acid group is carboxyl, phosphono, sulphino, sulpho, sulphamido, sulphoxy, sulphoalkoxy, sulphinoalkoxy and/or phosphonooxy groups.

5. The metal compounds according to claim 1, having as ketone, symmetrical or asymmetrical ketones with cyclic or acyclic aliphatic, araliphatic and/or aromatic radicals, at least one radical being non-aromatic.

6. The metal compounds according to claim 1, wherein, in the condensation products, the mole ratio of ketone/aldehyde/acid groups is 1/1-18/0.02-3 and in the co-condensation products, the proportion of aminoplast formers and/or of aromatic compounds and/or of condensation products thereof and/or of lignin sulphonate resins and/or of cellulose derivatives is 2 to 50% by weight, referred to the final condensation product.

7. The metal compounds according to claim 6, wherein, in the co-condensation products, the proportion of aminoplast formers and/ot of aromatic compounds and/or of condensation products thereof and/or of lignin sulphonate resins and/or of cellulose derivatives is 10 to 40% by weight, referred to the final condensation product.

8. The metal compounds according to claim 1, wherein, the metal complex compound, is a neutral or charged complex compound of a metal of Groups IIIA or VIIIA and/or of Groups IB to VB of the Periodic System.

9. The metal compounds according to claim 1, wherein the proportion of metal in the metal compounds is <70% by weight.

10. The metal compounds according to claim 9, wherein the proportion of metal in the metal compounds is 0.1 to 20% by weight.

11. A process for the preparation of metal compounds of claim 1, wherein acid group-containing ketone-aldehyde condensation products and/or co-condensation products are reacted with mono- to polyvalent metal compounds and/or metal complex compounds of metals of Groups IIIA to VIIIA and/or of groups IB to VB of the Periodic System.

12. The process according to claim 11, wherein the condensation products and/or co-condensation products are reacted with the metal compounds and/or metal complex compounds in the weight ratio of condensation product and/or co-condensation product/metal of the metal compounds and/or metal complex compounds of 100/<70.

13. The process according to claim 12, wherein said ratio is 100/0.1 to 20.

14. The process according to claim 11, wherein, the metal complex compound is a neutral or charged complex compound of a metal of Groups IIIA to VIIIA and/or of Groups IB to VB of the Periodic System.

15. The process according to claim 11, wherein the reaction is carried out at a temperature of from 10° to 250° C.

16. The process according to claim 15, wherein the reaction is carried out at a temperature of from 20° to 100° C.

17. The process according to claim 11, wherein the reaction with the metal compounds or metal complex compounds is carried out in a reaction mixture obtained in the production of the condensation products or co-condensation products, without previous isolation of the condensation or co-condensation products.

18. The process according to claim 11, wherein the metal is used as a salt or complex salt of an inorganic or organic acid, as an oxide or hydroxide or also in elementary form in the case of appropriate pH values for the in situ formation of a metal compound or metal complex compound.

19. The process according to claim 11, wherein the metal compound or metal complex compound is added in a process step for the production of the condensation products or co-condensation products.

20. The process according to claim 19, wherein the metal compound or metal complex compound is added to a reaction component or a mixture of two or more reaction components before the addition of the remaining reaction component or components.

21. Metal compounds produced by the process according to claim 11.

22. The use of metal compounds of claim 1, as thickening agents, retention agents, surface-active agents, emulsifiers, dispersion agents and/or liquefying agents.

23. The use of metal compounds of claim 1, in aqueous systems.

24. A ketone-aldehyde co-condensation product of at least one ketone and at least one aldehyde with at least one acid group-introducing compound and with at least one aminoplast former and/or at least one aromatic compound and/or at least one condensation product thereof and/or with at least one lignin sulphonate resin and/or with at least one cellulose derivative.

25. The co-condensation product of claim 24 wherein said acid groups are carboxyl, phosphono, sulphino, sulpho, sulphamido, sulphoxy, sulphoalkoxy, sulphinoalkoxy and/or phosphonooxy groups.

26. The co-condensation product of claim 24 wherein said ketones are symmetrical or asymmetrical ketones with cyclic or acyclic aliphatic, araliphatic and/or aromatic radicals, at least one radical being non-aromatic.

27. The co-condensation product of claim 24 wherein the mole ratio of ketone/aldehyde/acid groups is 1/1–18/0.02–3 and the proportion of aminoplast formers and/or of aromatic compounds and/or of condensation products thereof and/or of lignin sulphonate resins and/or of cellulose derivatives is 2 to 50% by weight, referred to the final condensation product.

28. The co-condensation products of claim 24 wherein the proportion of aminoplast formers and/or of aromatic compounds and/or of condensation products thereof and/or of lignin sulphonate resins and/or of cellulose derivatives is 10 to 40% by weight, referred to the final condensation product.

29. The co-condensation product of claim 24 wherein said aldehyde is formaldehyde, acetaldehyde, paraformaldehyde, paraldehyde, butyraldehyde, 3-methoxypropionaldehyde, acetaldol, acrolein, crotonaldehyde, furfural, 4-methoxyfurfural, propargylaldehyde, glyoxal or glutardialdehyde.

30. The co-condensation product of claim 24 wherein said ketone is acetone, methylethyl ketone, methyl isobutyl ketone, methoxyacetone, diacetone alcohol, ethyl acetoacetate, methyl vinyl ketone, misityl oxide, phorone, acetophenone, 4-methoxyacetophenone, 4-acetylbenzenesulphonic acid, diacetyl, acetylacetone, or benzoylacetone.

31. The co-condensation product of claim 24 wherein said aminoplast former is melamine, urea, guanamides, dicyandiamide, or aminoacetic acid.

32. The co-condensation product of claim 24 wherein said aldehyde is formaldehyde.

33. The co-condensation product of claim 24 wherein said aminoplast former is melamine and/or urea.

34. The co-condensation product of claim 24 containing lignin sulphonate resins derived from lignin containing products from the paper industries.

35. A process for the production of the co-condensation products of claim 24 by reaction of at least one ketone and at least one aldehyde with at least one acid group introducing compound and with at least one aminoplast former and/or aromatic compound and/or at least one condensation product thereof and/or with at least one lignin-sulphonate resin and/or cellulose derivative, wherein the reaction is carried out at a pH of 7 to 14.

36. The process of claim 35 wherein the reaction is carried out at a pH of 10 to 13.

37. The process of claim 35 wherein as acid group introducing compound, there is used the corresponding pure acid, a salt of this acid with a mono- to trivalent cation or an addition compound of the acid with an aldehyde or ketone.

38. The process of claim 35 wherein as acid group introducing compound, there is used an acid group-containing aminoplast former, aromatic compound, cellulose derivative and/or condensation product thereof.

39. The process of claim 35 wherein the aldehyde and/or ketone is used in the form of an addition compound with the acid corresponding to the acid groups.

40. The use of co-condensation products of claim 24 as a thickening agent, a surface active agent, an emulsifier, a dispersion agent or a liquefying agent.

* * * * *

UNITED STATES PATENT AND TRADEMARK OFFICE
CERTIFICATE OF CORRECTION

PATENT NO. : 4,666,979

DATED : May 19, 1987

INVENTOR(S) : Johann Plank et al

It is certified that error appears in the above-identified patent and that said Letters Patent is hereby corrected as shown below:

Column 1, line 26, "malamine" should read --melamine--.

Column 1, line 40, "marcromolecular" should read --macromolecular--.

Column 2, line 8, "b" should read --by--.

Column 2, line 64, after "Temperatures" insert --"--.

Column 3, line 8, "of" should read --or--.

Column 5, line 57, "s" should read --is--.

Column 8, line 47, "ccarbonates" should read --carbonates--.

Column 9, line 37, "ability" should read --solubility--.

Column 11, line 29, "alkali" should read --alkyl--.

Column 11, line 30, "leaast" should read --least--.

Column 12, line 9, "runds" should read --muds--.

Column 16, line 5, "crystalisation" should read --crystallisation--.

UNITED STATES PATENT AND TRADEMARK OFFICE
CERTIFICATE OF CORRECTION

PATENT NO. : 4,666,979

DATED : May 19, 1987

INVENTOR(S) : Johann Plank et al

It is certified that error appears in the above-identified patent and that said Letters Patent is hereby corrected as shown below:

Column 21, line 38, "fur" should read --für--.

Column 32, line 59, "chilling" should read --drilling--.

Signed and Sealed this

Eighth Day of June, 1993

Attest:

MICHAEL K. KIRK

Attesting Officer       Acting Commissioner of Patents and Trademarks